United States Patent
Carnevali

(10) Patent No.: US 9,945,673 B2
(45) Date of Patent: Apr. 17, 2018

(54) APPARATUS AND METHODS FOR ROUTING

(71) Applicant: Navionics Spa, Milan (IT)

(72) Inventor: Giuseppe Carnevali, Genoa (IT)

(73) Assignee: Navionics S.R.L. (IT)

( * ) Notice: Subject to any disclaimer, the term of this patent is extended or adjusted under 35 U.S.C. 154(b) by 0 days.

(21) Appl. No.: 14/797,592

(22) Filed: Jul. 13, 2015

(65) Prior Publication Data

US 2015/0362321 A1  Dec. 17, 2015

Related U.S. Application Data

(63) Continuation of application No. 13/723,655, filed on Dec. 21, 2012, now Pat. No. 9,086,278.

(51) Int. Cl.
*G01C 21/20* (2006.01)
*G01C 21/00* (2006.01)

(52) U.S. Cl.
CPC ............ *G01C 21/20* (2013.01); *G01C 21/00* (2013.01); *G01C 21/203* (2013.01)

(58) Field of Classification Search
CPC ....... G01C 21/00; G01C 21/20; G01C 21/203
USPC ............... 701/533, 435, 438, 418, 532, 410; 340/549.13
See application file for complete search history.

(56) References Cited

U.S. PATENT DOCUMENTS

| | | |
|---|---|---|
| 4,837,750 A | 6/1989 | Saunders |
| 5,209,112 A | 5/1993 | McCoy et al. |
| 5,400,300 A | 3/1995 | Bick et al. |
| 5,475,651 A | 12/1995 | Bishop et al. |
| 5,568,450 A | 10/1996 | Grande et al. |
| 5,785,281 A | 7/1998 | Peter et al. |
| 6,249,241 B1 | 6/2001 | Jordan et al. |
| 6,266,610 B1 | 7/2001 | Schultz et al. |
| 6,289,277 B1 | 9/2001 | Feyereisen et al. |
| 6,317,684 B1 | 11/2001 | Roeseler et al. |
| 6,356,837 B1 | 3/2002 | Yokota et al. |
| 6,381,538 B1 | 4/2002 | Robinson et al. |
| 6,469,664 B1 | 10/2002 | Michaelson et al. |
| 6,622,085 B1 | 9/2003 | Amita et al. |
| 6,653,947 B2 | 11/2003 | Dwyer et al. |
| 6,680,694 B1 | 1/2004 | Knockeart et al. |
| 6,697,329 B1 | 2/2004 | McAllister et al. |

(Continued)

FOREIGN PATENT DOCUMENTS

| | | |
|---|---|---|
| GB | 2474715 | 4/2011 |
| JP | 4108451 | 6/2008 |

(Continued)

OTHER PUBLICATIONS

Annex to form PCT/ISA/206—Communication Relating to the Results of the Partial International Search dated Jun. 16, 2014, issued in corresponding International Application No. PCT/IB2013/003168.

(Continued)

*Primary Examiner* — Marthe Y Marc-Coleman
(74) *Attorney, Agent, or Firm* — Samuel M. Korte; Max M. Ali

(57) ABSTRACT

An electronic navigational route developer may accept user input regarding the user's boat, such as height, draft and beam, and develop a route from a start point to end point based on cartographic information and the boat information.

15 Claims, 24 Drawing Sheets

(56) References Cited

U.S. PATENT DOCUMENTS

| | | |
|---|---|---|
| 6,721,694 B1 | 4/2004 | Lambrecht et al. |
| 6,734,808 B1 | 5/2004 | Michaelson et al. |
| 6,750,815 B2 | 6/2004 | Michaelson et al. |
| 6,754,485 B1 | 6/2004 | Obradovich et al. |
| 6,865,452 B2 | 3/2005 | Burdon |
| 6,865,476 B1 | 3/2005 | Jokerst, Sr. |
| 6,934,657 B1 | 8/2005 | Carlson et al. |
| 6,973,570 B1 | 12/2005 | Hamlin |
| 7,006,406 B2 | 2/2006 | Fujimoto et al. |
| 7,209,070 B2 | 4/2007 | Gilliland et al. |
| 7,209,829 B2 | 4/2007 | Litvack et al. |
| 7,268,703 B1 | 9/2007 | Kabel et al. |
| 7,768,447 B2 | 8/2010 | Pryszo et al. |
| 7,973,705 B2 | 7/2011 | Cunning et al. |
| 8,069,006 B1 | 11/2011 | Majzlik et al. |
| 8,082,100 B2 | 12/2011 | Grace et al. |
| 8,296,001 B1 | 10/2012 | Kabel et al. |
| 8,332,174 B1 | 12/2012 | Majzlik et al. |
| 8,417,451 B2 | 4/2013 | Hersey et al. |
| 8,463,458 B2 | 6/2013 | Wood et al. |
| 8,463,470 B2 | 6/2013 | Wood et al. |
| 8,510,028 B2 | 8/2013 | Grace et al. |
| 8,515,660 B2 | 8/2013 | Grace et al. |
| 8,515,661 B2 | 8/2013 | Grace et al. |
| 8,527,192 B2 | 9/2013 | Grace et al. |
| 8,543,324 B2 | 9/2013 | Grace et al. |
| 8,577,525 B2 | 11/2013 | Wood et al. |
| 8,606,432 B1 | 12/2013 | Wood et al. |
| 8,620,106 B2 | 12/2013 | Pryszo et al. |
| 8,831,868 B2 | 9/2014 | Grace et al. |
| 8,994,527 B2 | 3/2015 | Verhulst |
| 9,086,278 B2 | 7/2015 | Carnevali |
| 2006/0064242 A1 | 3/2006 | Litvack et al. |
| 2006/0089794 A1 | 4/2006 | DePasqua |
| 2007/0005240 A1* | 1/2007 | Oumi ............... G01C 21/3484 701/425 |
| 2007/0138347 A1* | 6/2007 | Ehlers ............... G01C 21/3461 246/1 R |
| 2007/0173139 A1 | 7/2007 | Gierke |
| 2007/0237028 A1 | 10/2007 | Jeffers |
| 2008/0027639 A1 | 1/2008 | Tryon |
| 2008/0133131 A1* | 6/2008 | Poreda ............... G01C 21/203 701/418 |
| 2008/0208445 A1* | 8/2008 | Bolton ............... G01C 21/3614 701/533 |
| 2009/0037040 A1 | 2/2009 | Salmon et al. |
| 2009/0058718 A1 | 3/2009 | Pryszo et al. |
| 2009/0067750 A1 | 3/2009 | Pryszo et al. |
| 2009/0099764 A1 | 4/2009 | Ninomiya et al. |
| 2010/0005419 A1 | 1/2010 | Miichi et al. |
| 2010/0057358 A1* | 3/2010 | Winer ............... G01C 21/3407 701/414 |
| 2010/0205060 A1* | 8/2010 | Athsani ............. G01C 21/3484 705/14.58 |
| 2010/0238025 A1 | 9/2010 | Verhulst |
| 2011/0012773 A1 | 1/2011 | Cunning et al. |
| 2011/0054784 A1 | 3/2011 | Wood et al. |
| 2011/0054785 A1 | 3/2011 | Wood et al. |
| 2011/0087426 A1 | 4/2011 | Feng |
| 2011/0098914 A1 | 4/2011 | Milbert et al. |
| 2011/0148623 A1* | 6/2011 | Bishop ............... G01C 21/20 340/539.13 |
| 2011/0310088 A1 | 12/2011 | Adabala et al. |
| 2011/0313655 A1 | 12/2011 | Litvack et al. |
| 2012/0158290 A1* | 6/2012 | Bharathan ......... G01C 21/3632 701/425 |
| 2012/0232719 A1 | 9/2012 | Salmon et al. |
| 2012/0259541 A1* | 10/2012 | Downey ............ G01C 21/3676 701/433 |
| 2013/0124088 A1 | 5/2013 | Bruce et al. |
| 2013/0328885 A1 | 12/2013 | Wood et al. |
| 2014/0180584 A1 | 6/2014 | Carnevali |
| 2014/0200806 A1 | 7/2014 | Carnevali |

FOREIGN PATENT DOCUMENTS

| | | |
|---|---|---|
| WO | 0125724 | 4/2001 |
| WO | 0125725 | 4/2001 |
| WO | 2014096960 | 6/2014 |

OTHER PUBLICATIONS

Levec, Frank, et al., "Manual of Instructions: Bathymetric Surveys," Jun. 2004, p. 1-27, Ministry of Natural Resources.

Lindburg, Matt, P.E., "Applications of Bathymetric Surveys using GPS and Sonar," 2000 Proceedings, p. 53-57, Association of Conservation Engineers.

Akyildiz, I.F., et al., "Wireless Sensor Networks: A Survey," vol. 38, 2002, p. 393-422, Computer Networks.

MaxSea User Guide, v8.0, I&M Dec. 2000, p. 1-320.

Pillich, Bohdan, "Time Varying Objects in ECDIS," Sep. 1995, p. 111-119, International Hydrographic Review, Monaco, LXXII(2).

GEONAV 4C User Guide, Jan. 2006, p. 1-76, Rev. 2.2, Navionics S.p.A.

"Apparatus and Method for Routing" Specification, Drawings, Claims and Prosecution History, of U.S. Appl. No. 13/723,655, filed Dec. 21, 2012, by Giuseppe Carnevali.

International Search Report and Written Opinion dated Dec. 1, 2015, issued in corresponding International Patent Application No. PCT/IB2015/055981.

Office Action dated Sep. 3, 2014 issued in corresponding U.S. Appl. No. 13/723,655.

ISRWO dated Oct. 14, 2015 issued in corresponding International Application No. PCT/IB2014/003100.

Invitation to Pay Additional Fees issued in corresponding International Application No. PCT/IB2014/003100.

ISRWO dated Aug. 28, 2014 issued in corresponding International Application No. PCT/IB2013/003168.

ISRWO dated Jun. 5, 2015 issued in corresponding International Application No. PCT/IB2013/003168.

Australian Office Action dated Sep. 13, 2017 issued in corresponding Australian Application No. 2013365921.

New Zealand office action dated Nov. 2, 2017 issued in New Zealand Application No. 710150.

*FLIR Systems, Inc. and FLIR Maritime US, Inc. v. Garmin Switzerland GmbH*, Inter Partes Review No. IPR2017-00946 Petition for Inter Partes Review, Feb. 17, 2017.

*FLIR Systems, Inc. and FLIR Maritime US, Inc. v. Garmin Switzerland GmbH*, Inter Partes Review No. IPR2017-00946 Declaration of Dr. Michael S. Braasch, Feb. 16, 2017.

De Jong, Wichert J., et al. "Automated Route Planning; A Network-Based Route Planning Solution for Marine Navigation," Department of Nautical Sciences, Royal Netherlands Naval College, Institute of Engineering Surveying & Space Geodesy, University of Nottingham, Bergen, Dec. 2001.

Tetley, L., et al., "Electronic Navigation Systems," Third Edition, Butterworth-Heineman, 2001.

Brogdon, Captain Bill, "Boat Navigation for the Rest of Us; Finding Your Way by Eye and Electronics," Second Edition, International Marine, 2001.

Assembly 19th Session, Agenda Item 10, Resolution A.817(19), Performance Standards for Electronic Chart Display and Information Systems (ECDIS), Nov. 23, 1995.

Xiaoxia, Wan, et al., "Electronic Chart Display and Information System," ISSN:1009-5020, Geo-spatial Information Science (Quarterly), vol. 5, Issue 1, p. 7-11, Mar. 5, 2002.

*FLIR Systems, Inc. and FLIR Maritime US, Inc. v. Garmin Switzerland GmbH*, Inter Partes Review No. IPR2017-00946 Declaration of Scott Bennett, Ph.D., Jan. 19, 2017.

*FLIR Systems, Inc. and FLIR Maritime US, Inc. v. Garmin Switzerland GmbH*, Inter Partes Review No. IPR2017-00946 Declaration of Martinus Van Der Drift, Jan. 27, 2017.

Sabelis, Hein, "Voyage Planning in ECDIS," International Hydrographic Review, Monaco, LXXVI(2), Sep. 1999.

(56) References Cited

OTHER PUBLICATIONS

Bowditch, Nathaniel, LL.D., "The American Practical Navigator An Epitome of Navigation," Pub. No. 9, National Imagery and Mapping Agency, Bicentennial Edition 2002.
Encyclopedia of Electronics, 2nd Edition, TAB Professional and Reference Books, definition of Computer, pp. 197-201, definition of Microprocessor pp. 552-554, and definition of Software p. 780, McGraw-Hill, Inc. 1990.
*FLIR Systems, Inc. and FLIR Maritime US, Inc. v. Garmin Switzerland GmbH*, Inter Partes Review No. IPR2017-00946 Patent Owner's Preliminary Response to Petition for Inter Partes Review, Jun. 13, 2017.
McGraw-Hill Dictionary of Scientific and Technical Terms, Sixth Edition, definition of "Navigation"; p. 1404, McGraw-Hill, Inc. 2003.
*FLIR Systems, Inc. and FLIR Maritime US, Inc. v. Garmin Switzerland GmbH*, Inter Partes Review No. IPR2017-00946 Decision Institution of Inter Partes Review, Aug. 10, 2017.
*FLIR Systems, Inc. and FLIR Maritime US, Inc. v. Garmin Switzerland GmbH*, Inter Partes Review No. IPR2017-00946 Patent Owner's Response to Petition for Inter Partes Review, Jun. 13, 2017.
*FLIR Systems, Inc. and FLIR Maritime US, Inc. v. Garmin Switzerland GmbH*, Inter Partes Review No. IPR2017-00946 Declaration of Captain Steven Browne, Nov. 15, 2017.
U.S. Department of Homeland Security, United States Coast Guard, Navigation Rules, International-Inland, 1989.

\* cited by examiner

FIG. 4Aiii

FIG. 4Aii

FIG. 4Biii

FIG. 4Bii

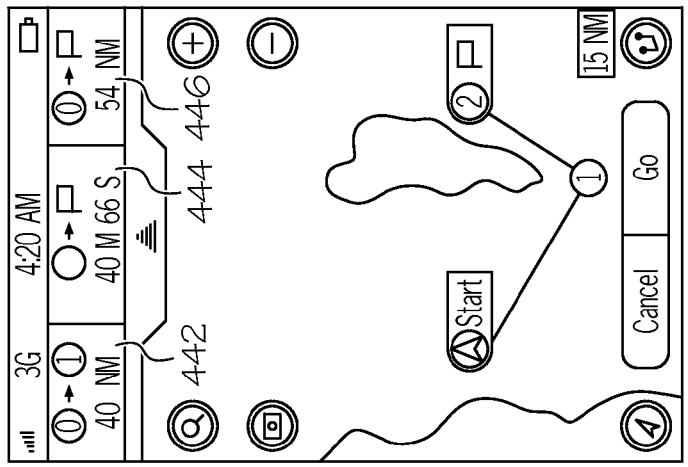
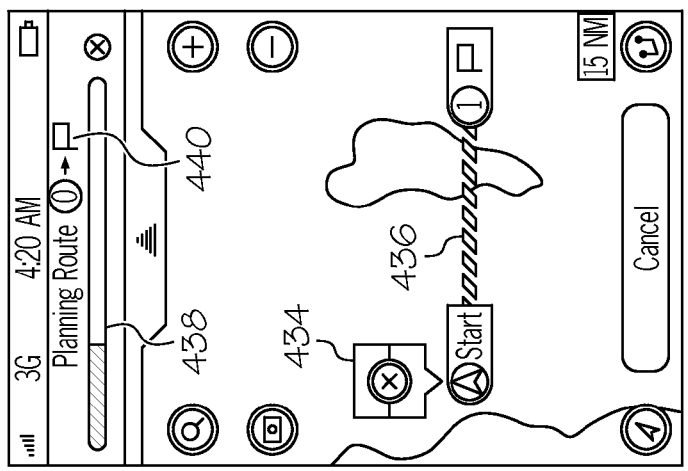
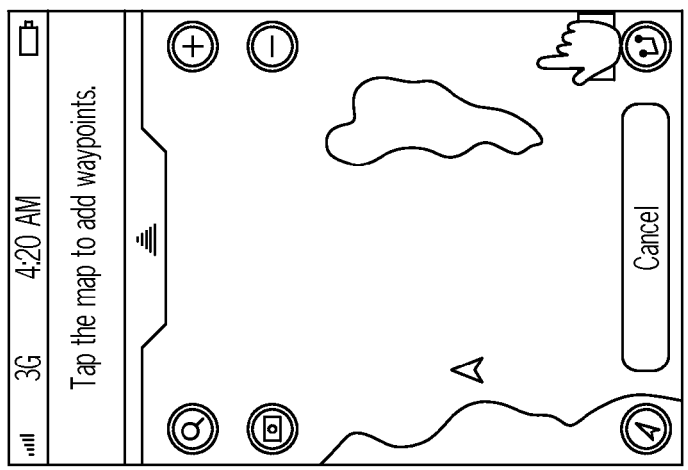
FIG. 4Ciii   FIG. 4Cii   FIG. 4Ci

FIG. 4Diii

FIG. 4Dii

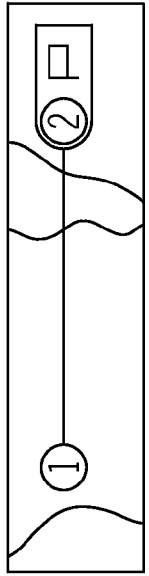
FIG. 4Eii
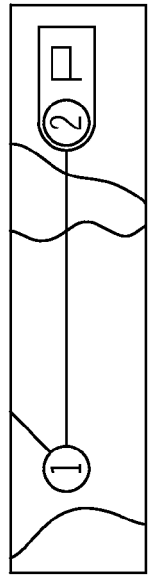
FIG. 4Eiv
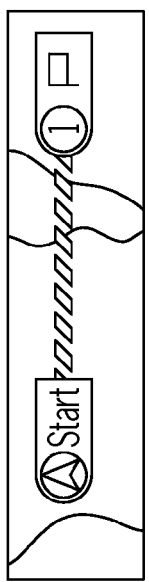
FIG. 4Ei
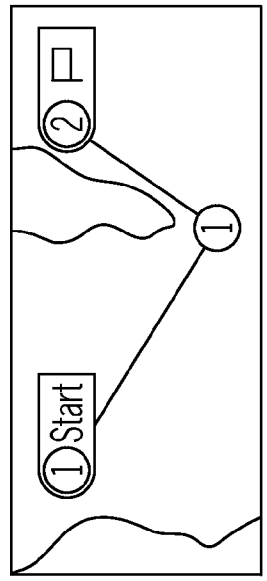
FIG. 4Eiii

FIG. 4Fiii

FIG. 4Fii

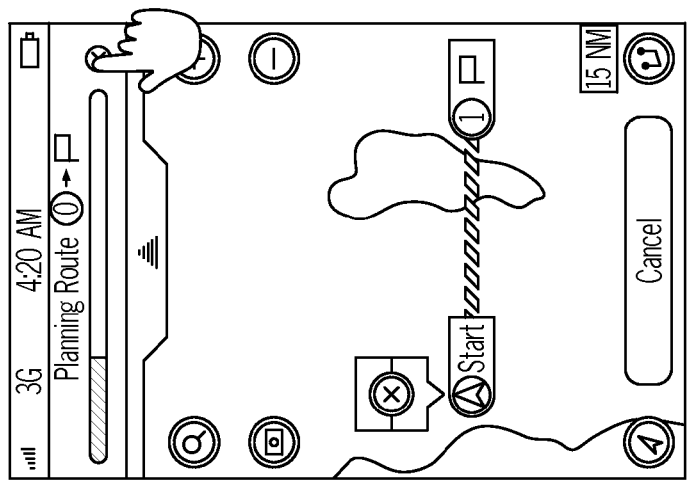
FIG. 4Gi
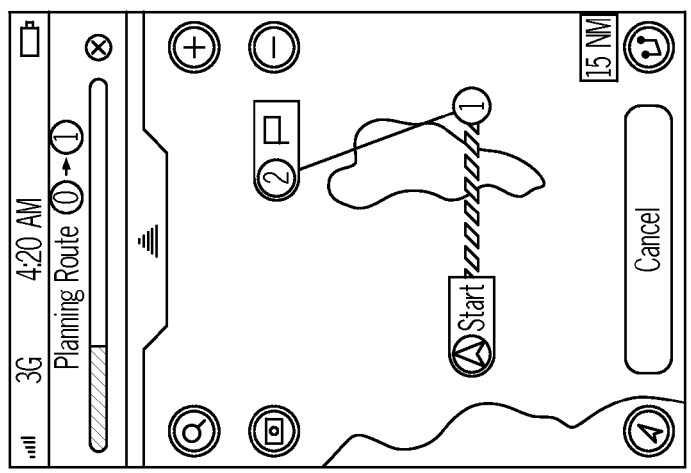
FIG. 4Gii
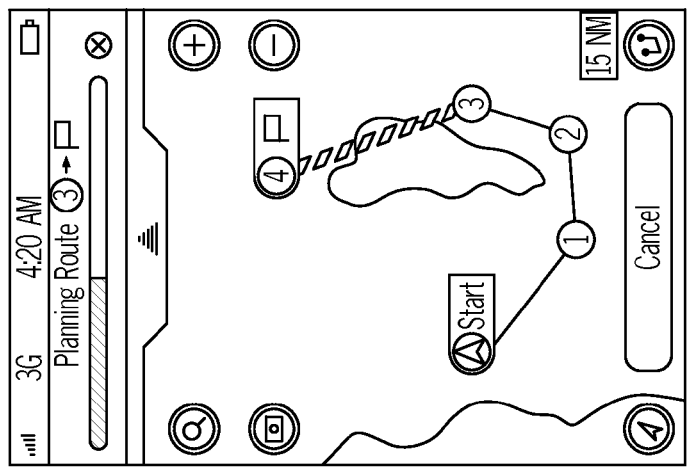
FIG. 4Giii

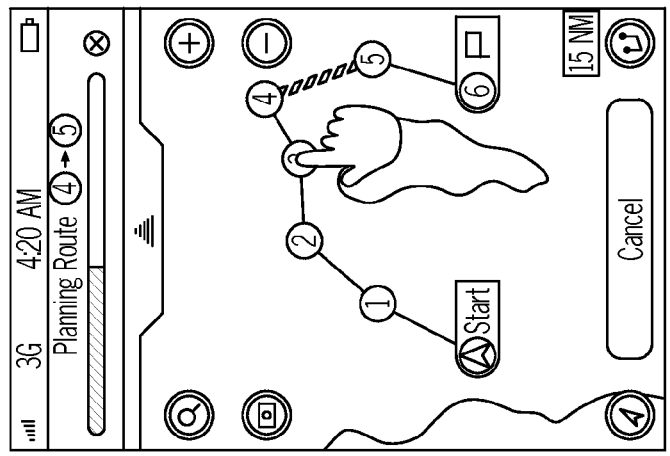
FIG. 4Gvi
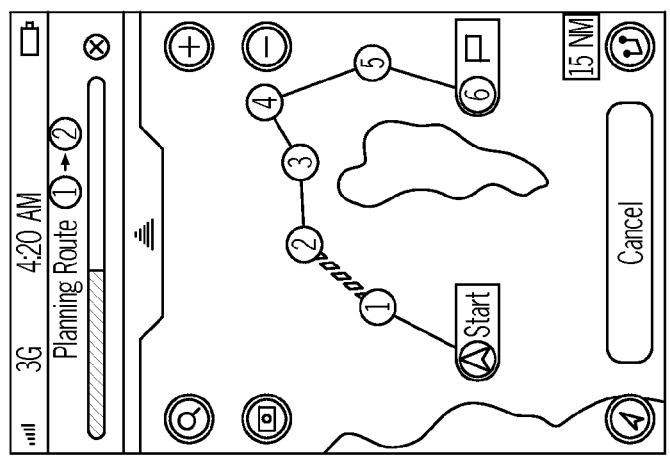
FIG. 4Gv
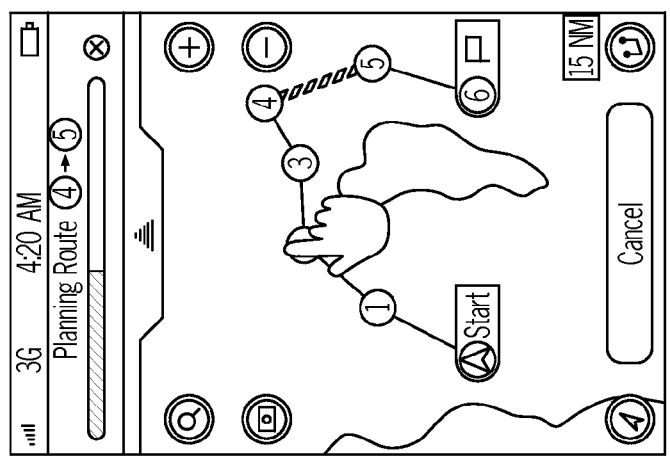
FIG. 4Giv

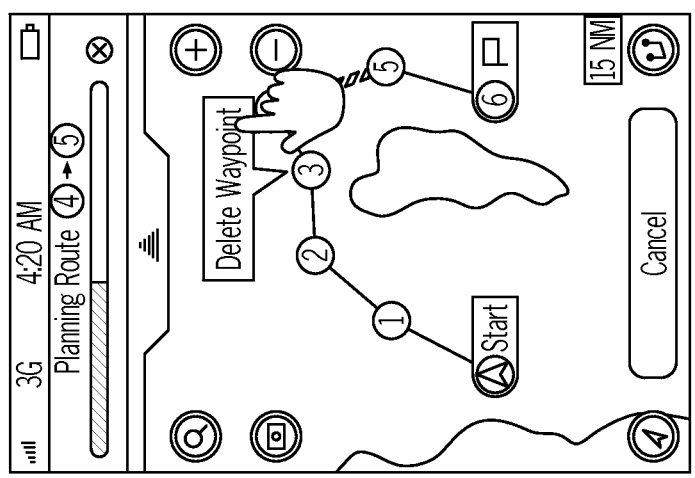
FIG. 4Gvii
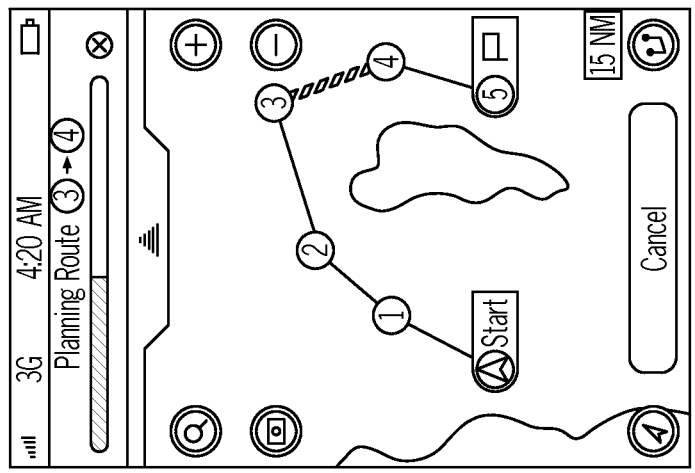
FIG. 4Gviii

FIG. 4Hiii

FIG. 4Hii

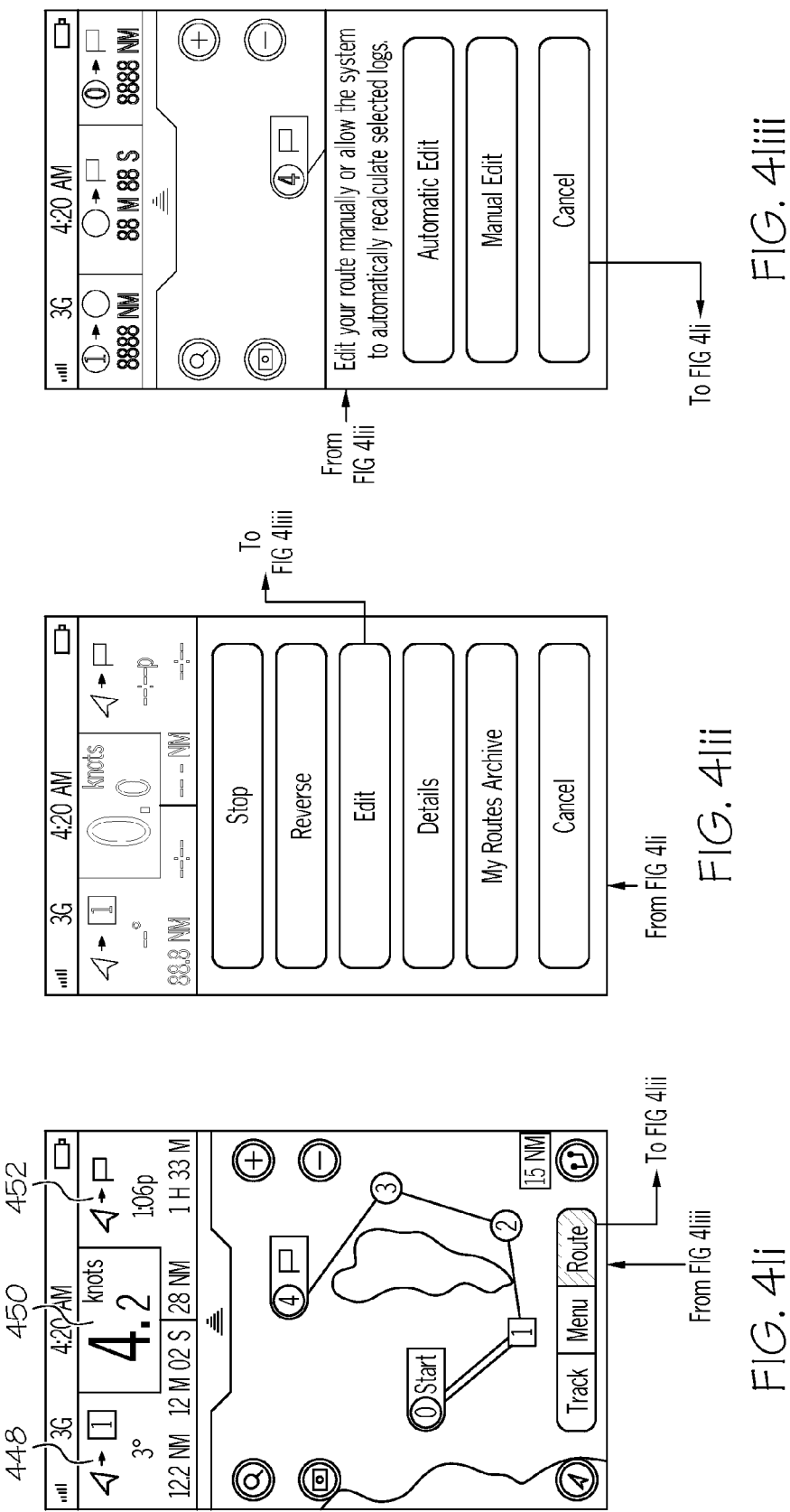

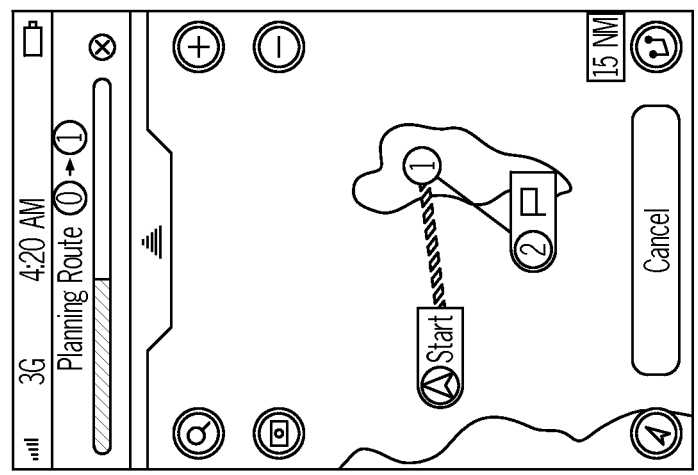
FIG. 4Ji
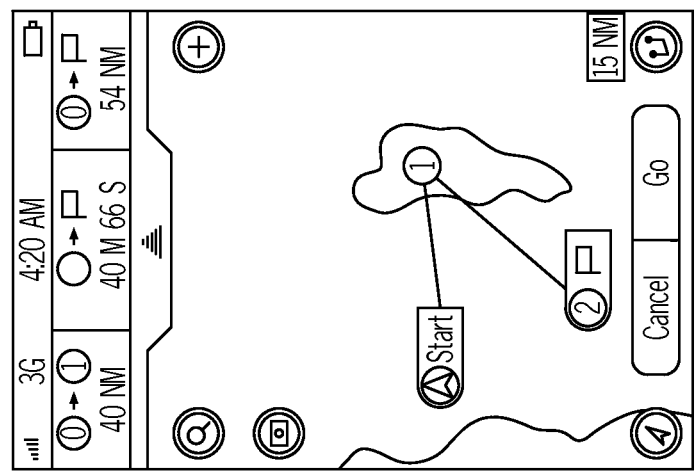
FIG. 4Jii

APPARATUS AND METHODS FOR ROUTING

RELATED APPLICATIONS

This application is a continuation application of U.S. patent application Ser. No. 13/723,655 filed on Dec. 21, 2012, the contents of which applications are incorporated herein in their entirety by reference.

BACKGROUND

Inventive concepts relate to navigational devices and, more particularly, to navigational routers, and methods for performing navigational routing.

Marine vessels may be equipped with radios, radar systems, cameras, global positioning system (GPS) transponders, SONAR systems, and other sensors that provide a variety of information for the operator of the marine vessel, also referred to herein as, simply, a boater. A boater may employ such information, along with other information, such as that obtained from navigational charts, to plan a navigational route, or course, and to navigate along that course to reach a desired destination. Navigational routers, which may be manual or automatic navigational routers, for example, may assist a boater in such endeavors.

Existing navigational routers may be somewhat inflexible, may provide unsatisfactory levels of feedback to operators, or may be incapable of routing under certain circumstances.

SUMMARY OF THE INVENTION

Exemplary embodiments in accordance with principles of inventive concepts include an electronic navigational router, that includes an electronic navigational automatic route developer; a user interface; and electronic route storage to store route data related to a route developed by the electronic route developer. In this manner, improved navigational routers, such as marine routers, and methods of performing navigational routing, are provided.

In exemplary embodiments in accordance with principles of inventive concepts an electronic navigational router includes an electronic navigational automatic route developer that is configured to accept user input through the user interface to edit a route developed by the automatic route developer.

In exemplary embodiments in accordance with principles of inventive concepts an electronic navigational router includes an automatic route developer that is configured to retrieve a stored route for editing.

In exemplary embodiments in accordance with principles of inventive concepts an electronic navigational router includes an electronic navigational automatic route developer accepts user input to edit a route as the route is being developed.

In exemplary embodiments in accordance with principles of inventive concepts an electronic navigational router includes an electronic route developer and a user interface to accept user input regarding the end point of a route, wherein the electronic route developer is configured to automatically develop a route based upon the user-supplied start end point and the route includes at least one intervening waypoint when the end point and a start point are not points of navigable visibility to one another.

In exemplary embodiments in accordance with principles of inventive concepts an electronic navigational router is configured to accept either a user-supplied start point or a navigational system-supplied start point.

In exemplary embodiments in accordance with principles of inventive concepts an electronic navigational router is configured to discretize a multidimensional region that encompasses user-supplied start and end points.

In exemplary embodiments in accordance with principles of inventive concepts an electronic navigational router is configured to extract potential waypoints from cartographic data representing a region that encompasses user-supplied start and end points.

In exemplary embodiments in accordance with principles of inventive concepts an electronic navigational router is configured to associate a node with each discretized cell within the region.

In exemplary embodiments in accordance with principles of inventive concepts an electronic navigational router is configured to develop a set of candidate nodes based upon points of navigable visibility.

In exemplary embodiments in accordance with principles of inventive concepts an electronic navigational router is configured to select a node from among the candidate nodes to be a selected node based upon the cost of the link between the current selected node and the candidate nodes.

In exemplary embodiments in accordance with principles of inventive concepts an electronic navigational router is configured to develop a route using start and end points and selected nodes to complete the route between start and end nodes.

In exemplary embodiments in accordance with principles of inventive concepts an electronic navigational router is configured to extract potential waypoints from cartographic data representing sub-region a region that encompasses user-supplied start and end points.

In exemplary embodiments in accordance with principles of inventive concepts an electronic navigational router is configured to associate a node with each discretized cell within the sub-region.

In exemplary embodiments in accordance with principles of inventive concepts an electronic navigational router is configured to develop a set of candidate nodes from among the nodes within discretized cells, based upon points of navigable visibility.

In exemplary embodiments in accordance with principles of inventive concepts an electronic navigational router is configured to select a node from among the candidate nodes to be a selected node based upon the cost of the link between the current selected node and the candidate nodes.

In exemplary embodiments in accordance with principles of inventive concepts an electronic navigational router is configured to develop a route using start and end points and selected nodes to complete the route between start and end nodes.

In exemplary embodiments in accordance with principles of inventive concepts an electronic navigational router includes a smartphone-based automatic electronic route developer and a user interface to accept user input regarding characteristics of a boat for which a route is to be developed, wherein the electronic route developer is configured to automatically develop a navigational route based on the input regarding the boat's characteristics.

In exemplary embodiments in accordance with principles of inventive concepts an electronic navigational router is configured to accommodate a point obstruction.

In exemplary embodiments in accordance with principles of inventive concepts an electronic navigational router is configured to accept user input regarding a navigational route and to respond to user input by editing a route.

In exemplary embodiments in accordance with principles of inventive concepts an electronic navigational router includes a user interface configured to accept user input to allow a user to set a start point for the route to be developed at a location other than the current location of the electronic navigational route developer.

In exemplary embodiments in accordance with principles of inventive concepts an electronic navigational router includes an automatic electronic navigational route developer, a manual electronic navigational route developer, and a user interface to accept user input to allow a user to select either the automatic or manual electronic route developer to develop a navigational route.

In exemplary embodiments in accordance with principles of inventive concepts an electronic navigational router is responsive to user input to edit a route.

In exemplary embodiments in accordance with principles of inventive concepts an electronic navigational router is responsive to user input to edit a route that is currently being developed by the automatic electronic route developer.

In exemplary embodiments in accordance with principles of inventive concepts an electronic navigational router is responsive to user input to delete a waypoint by deleting the waypoint from the route and directly connecting the two waypoints to which the deleted waypoint had been linked.

In exemplary embodiments in accordance with principles of inventive concepts an electronic navigational router is responsive to user input to add a waypoint by adding the waypoint, breaking the link between the two nearest waypoints, and creating links that connect the new waypoint to the two nearest waypoints.

In exemplary embodiments in accordance with principles of inventive concepts an electronic navigational router is responsive to user input to move a waypoint by automatically adjusting the links between the moved waypoint and its neighboring waypoints to which it is connected.

In exemplary embodiments in accordance with principles of inventive concepts an electronic navigational router includes an automatic electronic navigational route developer and a user interface to accept user input regarding a navigational route and to respond to user input by editing a route.

In exemplary embodiments in accordance with principles of inventive concepts an electronic navigational router includes an automatic electronic navigational route developer and a user interface to accept user input to allow a user to set a start point for the route to be developed at a location other than the current location of the electronic navigational route developer.

In exemplary embodiments in accordance with principles of inventive concepts an electronic navigational router includes an automatic electronic navigational route developer, a manual electronic navigational route developer, and a user interface to accept user input to allow a user to select either the automatic or manual electronic route developer to develop a navigational route.

In exemplary embodiments in accordance with principles of inventive concepts an electronic navigational router is responsive to user input to edit a route.

In exemplary embodiments in accordance with principles of inventive concepts an electronic navigational router is responsive to user input to edit a route that is currently being developed by the automatic electronic route developer.

In exemplary embodiments in accordance with principles of inventive concepts an electronic navigational router is responsive to user input to delete a waypoint by deleting the waypoint from the route and directly connecting the two waypoints to which the deleted waypoint had been linked.

In exemplary embodiments in accordance with principles of inventive concepts an electronic navigational router is responsive to user input to add a waypoint by adding the waypoint, breaking the link between the two nearest waypoints, and creating links that connect the new waypoint to the two nearest waypoints.

In exemplary embodiments in accordance with principles of inventive concepts an electronic navigational router is responsive to user input to move a waypoint by automatically adjusting the links between the moved waypoint and its neighboring waypoints to which it is connected.

In exemplary embodiments in accordance with principles of inventive concepts an electronic navigational router is configured to display a waypoint between the start point and end point.

In exemplary embodiments in accordance with principles of inventive concepts an electronic navigational router includes an electronic navigational automatic route developer, a user interface; and electronic route storage to store route data related to a route developed by the electronic route developer, wherein the automatic route developer incorporates tidal information in the development of a route.

In exemplary embodiments in accordance with principles of inventive concepts a method for performing navigational routing comprises: providing an electronic navigational automatic route developer; providing a user interface; and storing route data related to a route developed by the electronic route developer at an electronic route storage.

In exemplary embodiments in accordance with principles of inventive concepts a method for performing navigational routing comprises: providing an electronic route developer; and accepting user input regarding the end point of a route at a user interface, wherein the electronic route developer is configured to automatically develop a route based upon the user-supplied start end point and the route includes at least one intervening waypoint when the end point and a start point are not points of navigable visibility to one another.

In exemplary embodiments in accordance with principles of inventive concepts a method for performing navigational routing comprises: providing a smartphone-based automatic electronic route developer; and accepting user input regarding characteristics of a boat for which a route is to be developed at a user interface, wherein the electronic route developer is configured to automatically develop a navigational route based on the input regarding the boat's characteristics.

In exemplary embodiments in accordance with principles of inventive concepts a method for performing navigational routing comprises: providing an automatic electronic navigational route developer; and accepting user input regarding a navigational route at a user interface and responding to user input by editing a route.

In exemplary embodiments in accordance with principles of inventive concepts a method for performing navigational routing comprises: providing an automatic electronic navigational route developer; and accepting, at a user interface, user input to allow a user to set a start point for the route to be developed at a location other than the current location of the electronic navigational route developer.

In exemplary embodiments in accordance with principles of inventive concepts a method for performing navigational routing comprises: providing an automatic electronic navigational route developer; providing a manual electronic navigational route developer; and accepting, at a user interface, user input to allow a user to select either the automatic or manual electronic route developer to develop a navigational route.

In exemplary embodiments in accordance with principles of inventive concepts a method for performing navigational routing comprises: providing an electronic navigational automatic route developer; providing a user interface; and storing route data related to a route developed by the electronic route developer at an electronic route storage, wherein the automatic route developer incorporates tidal information in the development of a route.

BRIEF DESCRIPTION OF THE DRAWINGS

Exemplary embodiments in accordance with principles of inventive concepts will be more clearly understood from the following detailed description taken in conjunction with the accompanying drawings in which:

FIGS. 4A through 4K illustrate an exemplary embodiment of a process of developing a navigational route in accordance with principles of inventive concepts.

DETAILED DESCRIPTION

Figure 1:
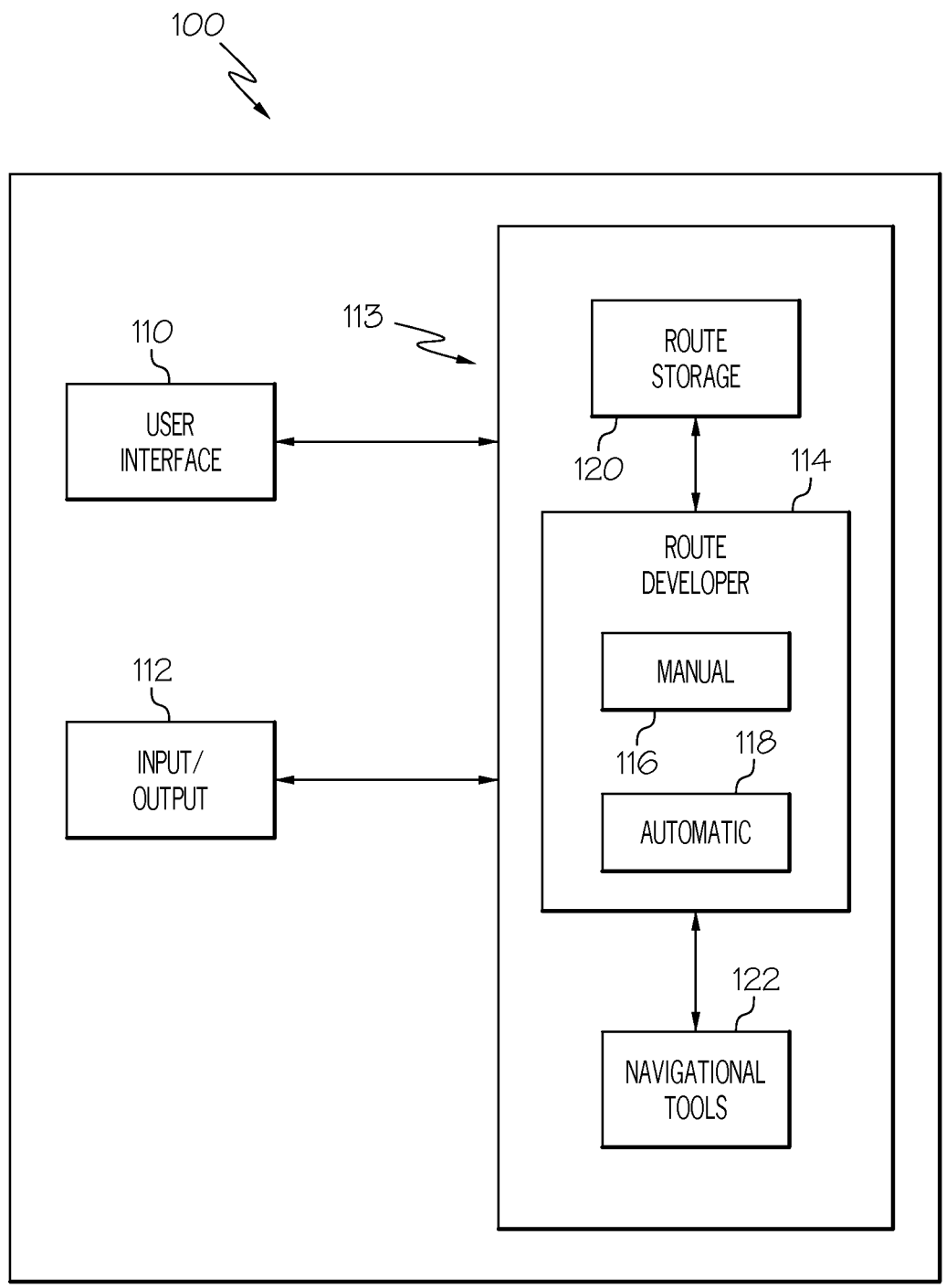
FIG. 1 is a block diagram of an exemplary embodiment of an electronic navigational router in accordance with principles of inventive concepts.

Exemplary embodiments in accordance with principles of inventive concepts will now be described more fully with reference to the accompanying drawings, in which exemplary embodiments are shown. Exemplary embodiments in accordance with principles of inventive concepts may, however, be embodied in many different forms and should not be construed as being limited to the embodiments set forth herein; rather, these embodiments are provided so that this disclosure will be thorough and complete, and will fully convey the concept of exemplary embodiments to those of ordinary skill in the art. Like reference numerals in the drawings denote like elements, and thus their description may not be repeated.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Other words used to describe the relationship between elements should be interpreted in a like fashion (for example, "between" versus "directly between," "adjacent" versus "directly adjacent," "on" versus "directly on"). The word "or" is used in an inclusive sense, unless otherwise indicated.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of exemplary embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative term's are intended to encompass different orientations of the device in use or operation in addition to the orientation depicted in the figures. For example, if an element in the figures is turned over, elements described as "bottom," "below," "lower," or "beneath" other elements or features would then be oriented "atop," or "above," the other elements or features. Thus, the exemplary terms "bottom," or "below" can encompass both an orientation of above and below, top and bottom. The device may be otherwise oriented (rotated 90 degrees or at other orientations) and the spatially relative descriptors used herein interpreted accordingly.

The terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which exemplary embodiments in accordance with principles of inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

An exemplary embodiment of a navigational routing system 100 in accordance with principles of inventive concepts is depicted in the block diagram of FIG. 1. The navigational routing system 100 includes a user interface 110, and an input/output system 112. A routing subsystem 113 includes a route developer 114, which, in accordance with principles of inventive concepts, includes manual 116 and automatic 118 route development components. Route storage 120 may be used, in accordance with principles of inventive concepts, to store and retrieve completed routes, either automatically or under the direction of a user, for example.

As will be described in greater detail in the discussion related to the following FIGs, a route may be developed manually or automatically. Regardless of the manner in which a route is developed, it may be stored in route storage 120 and later retrieved by a user, either for direct, immediate use (for example, while cruising), or to be edited in order to develop a different route that may be modified relative to the previously stored route. Information related to geographical and navigational features, such as navigational chart information, point obstructions, navigational buoys, and other man-made obstructions, may be downloaded and stored in the navigational routing system 100. In various embodiments, the download and retrieval of geographical and navigational feature information can occur via the internet from a host system. This download can take place in real time, so that the feature information is retrieved each time a user performs a route development operation, or can take place offline, so that the entire database of geographical and navigational information is downloaded and stored on the system 100 a single time and always available to a user, even during times when internet access is unavailable. Navigation tools 122, which may be housed separately from the routing subsystem 113, may operate in concert with routing subsystem 113 to, for example, update the current position, speed, and heading of a user's vessel.

As will be described in greater detail in the discussion related to the following FIGs, navigational routing system 100 may be implemented on a portable electronic device, such as a dedicated marine navigation system, a laptop computer, a notebook computer, a tablet computer, or smartphone, for example. User interface 110, which will be described in greater detail in the discussion related to the following FIGs, and, in particular, FIG. 5, accepts input from a user and outputs information to a user. User interface 110 may include devices that allow the system 100 to accept user input through voice, touchscreen, keyboard, trackball, joystick, or other device, for example. User interface 110 may also include devices that allow output in the form of displays or audio output, for example.

In accordance with principles of inventive concepts route developer 114 may develop a route from a starting point to ending point that includes a plurality of legs, or links, (that is, reaches between two waypoints, also referred to herein as "nodes," which may represent waypoints) along the way. As will be described in the discussion related to the following FIGs, user interface 110 may display information related to a plurality of those legs in accordance with principles of inventive concepts. User interface 110 may also allow a user to input information or commands that allow a user to edit developed routes, either on-the-fly, as the route is being developed, or in a store-and-retrieve manner. In accordance with principles of inventive concepts a user may manually or automatically edit developed routes, regardless of whether the routes have been manually or automatically generated.

Figure 2:
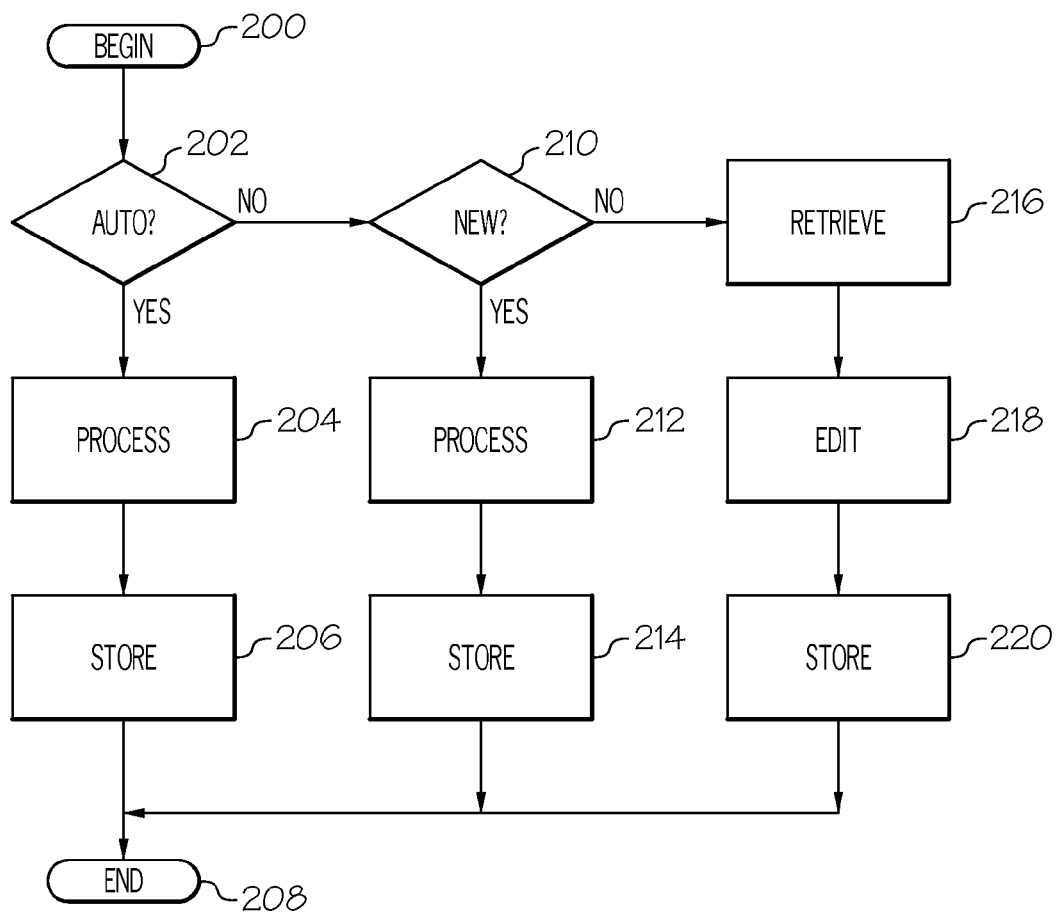
FIG. 2 is a flow chart of an exemplary embodiment of a process of developing a navigational route in accordance with principles of inventive concepts.

The flow chart of FIG. 2 depicts an exemplary embodiment of a navigational routing process in accordance with principles of inventive concepts. The process begins in process step 200 and proceeds from there to step 202. In an exemplary process in step 202 a navigational router in accordance with principles of inventive concepts determines whether the routing process is to be automatic or manual. As will be described in greater detail in the discussion related to the following FIGs, a user may be prompted by a router 100 to select an operational mode, manual or automatic, at the beginning of a routing process. If routing is to be automatic, the process proceeds to step 204 where automatic routing is carried out. Automatic routing in accordance with principles of inventive concepts will be described in greater detail in the discussion related to FIGS. 3A through 3H, for example. After automatic routing, which, in accordance with principles of inventive concepts, may include user interaction and "on-the-fly" editing, the process proceeds to optional step 206, where the system 100 may, automatically or under control of a user, store a developed route. From step 206 the process proceeds to end in step 208.

Returning to step 202, if manual routing is selected, the process proceeds to step 210, where the decision is made to either manually process a new route or manually process a previously developed and stored route. If a new route is to be processed, the process proceeds to step 212, where manual routing is carried out. Manual routing in accordance with principles of inventive concepts will be described in greater detail in the discussion related to other FIGs. From step 212 the process proceeds to step 214 where the processed route may, optionally, be stored. From step 214, the process proceeds to end in step 208.

Returning to step 210, if the decision is made to manually route, or edit, a previously generated route the process proceeds to step 216, where the routing system retrieves a previously created route, for example, from storage 120. From step 216 the process proceeds to step 218 where the existing route is edited. A route editing process in accordance with principles of inventive concepts will be described in greater detail in the discussion related to other FIGs herein. From step 218 the process proceeds to step 220 where the route may be stored in accordance with principles of inventive concepts. From step 220 the process proceeds to end in step 208.

Figure 3A:
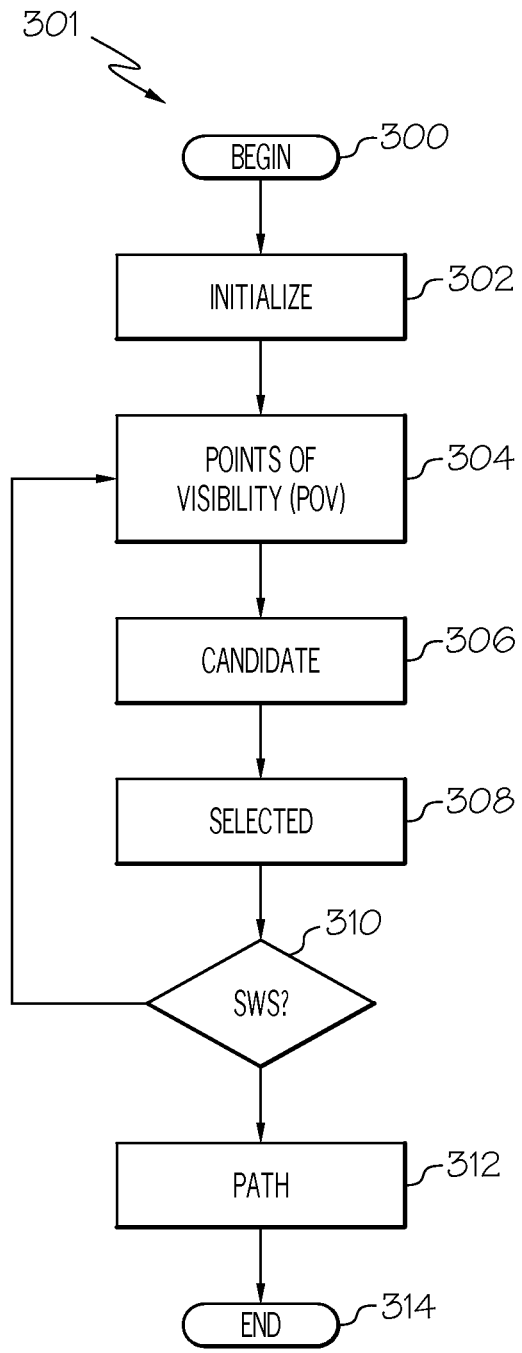
FIGS. 3A through 3H illustrate an exemplary embodiment of a process of automatically developing a navigational route in accordance with principles of inventive concepts.
Figure 3B:
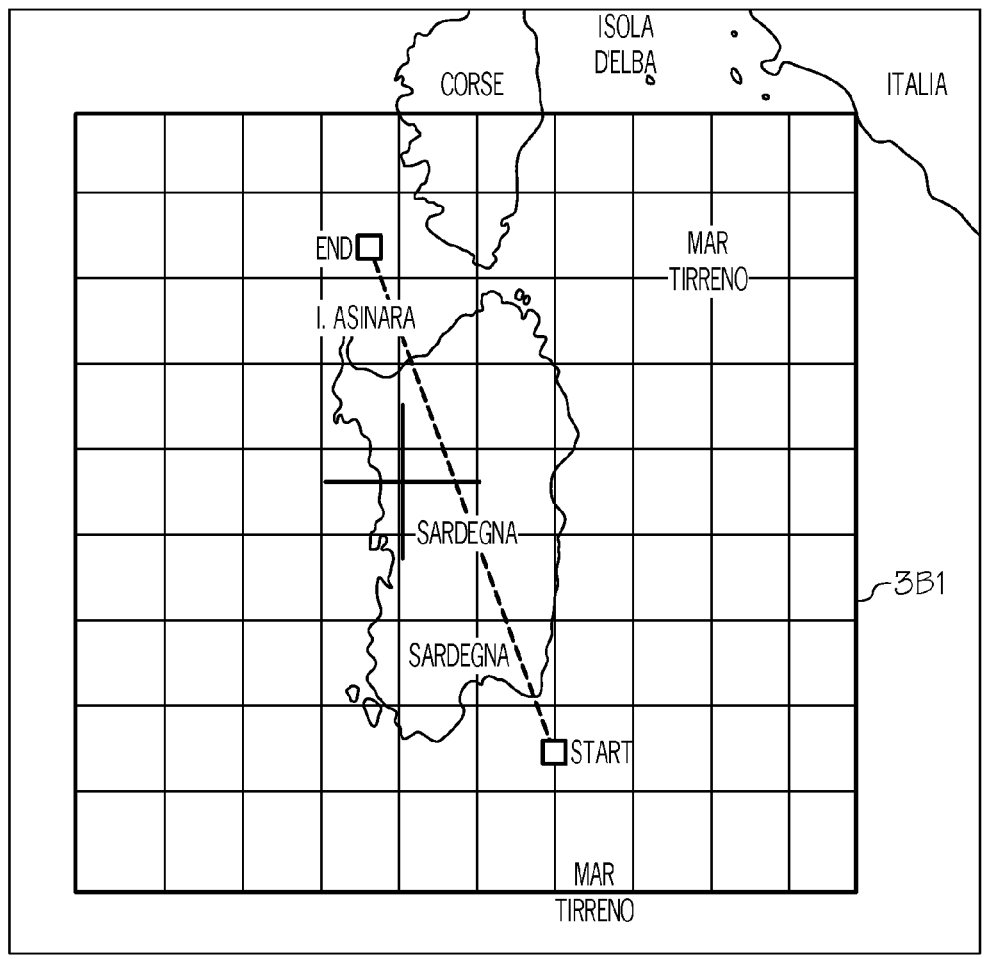
Figure 3C:
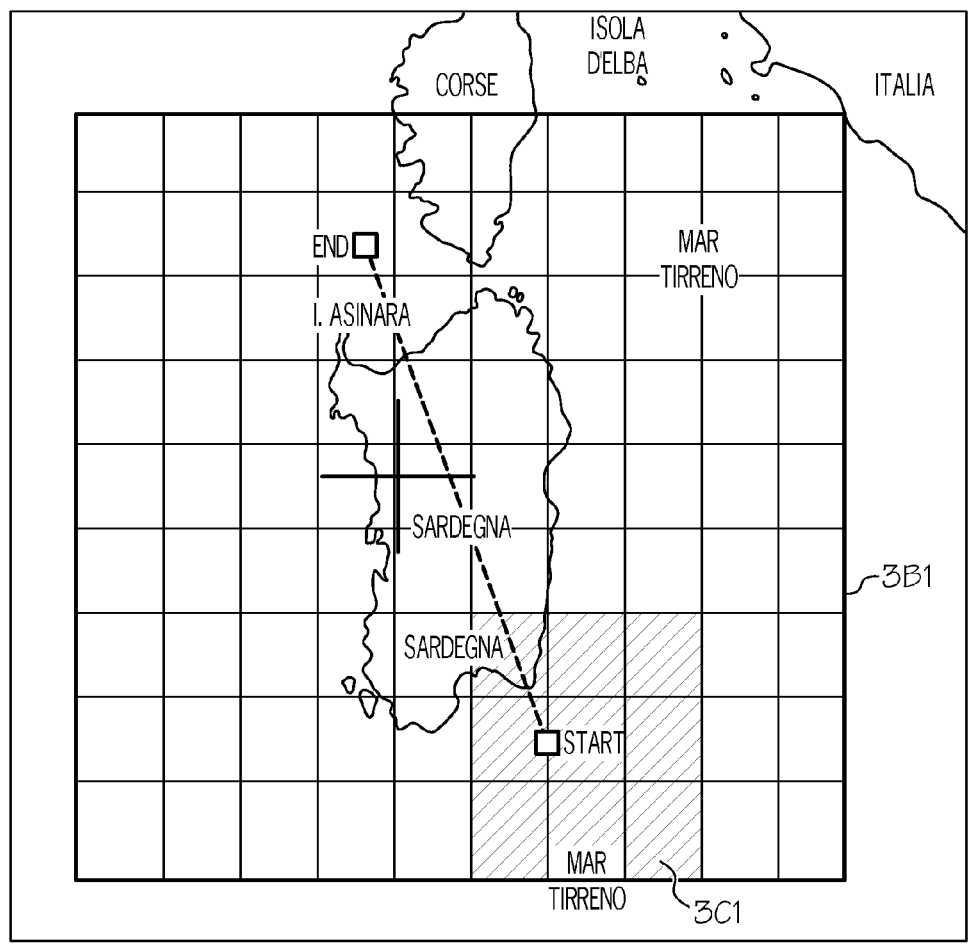

An exemplary embodiment of the process of automatically developing a route in accordance with principles of inventive concepts is depicted in the flow chart of FIG. 3B. In an exemplary embodiment of an automatic routing process in accordance with principles of inventive concepts, a path-finding process based on A* may be employed. A* is known and described, for example, in "Generalized best-first search strategies and the optimality of A*," Journal of the ACM 32(3):505-536. In accordance with principles of inventive concepts, memory usage may be reduced to accommodate relatively limited amounts of storage available to a portable electronic device such as may be employed by an automatic navigational router in accordance with principles of inventive concepts. Reducing memory usage and employing non-optimal routing may also increase operational speed, particularly when using devices, such as portable electronic devices, that may posses only limited processing power. Such a process, particularly the interactive aspects of such a process, will be described in greater detail in the discussion related to other FIGs herein, and, in particular FIGS. 3B through 4J.

In this exemplary embodiment the process begins in step 300, where, as described in greater detail in the discussion related to FIGS. 3B and 4C, for example, user input is received indicating the start point and endpoint of a desired route. From step 300 the process proceeds to step 302. In step 302 a geographic area of interest is defined and data structures are initialized. In accordance with principles of inventive concepts the initialization includes a uniform square discretization of a multidimensional region that encompasses the start and end nodes of a route to be developed. The information related to the multidimensional region may be obtained, for example, from charts that characterize a body of water upon which the user intends to travel from starting node to ending node. In accordance with principles of inventive concepts, a node may be placed in every discretized cell and each node connected with its eight neighbors using bidirectional edges. Costs of edges may be assigned as being equal to their Euclidean lengths. Nodes may be generated on the fly and the least-cost (that is, for example, shortest distance) path between starting and ending nodes is selected as the automatically developed route. In accordance with principles of inventive concepts, in order to reduce computing time and/or memory requirements, various weightings may be applied to the process to obtain sub-optimal results, for example.

In accordance with principles of inventive concepts, the geographic area of interest may be determined by the starting location (also referred to herein as the starting node) and goal, or end, locations (also referred to herein as the end, or goal, node) of a proposed route. In accordance with principles of inventive concepts, memory use is minimized, or reduced, for example, by storing data related to only a portion of the geographic area of interest while developing a route, by compressing that data, and by calculating legs, or links, between nodes "on-the-fly," without storing them. Additionally, due to possibly limited processing power, an automatic routing process may employ suboptimal processing, yielding results that, although not "optimal," are suitable for use in an automatic routing environment. Additionally, by processing only a portion of a geographic area of interest during each iteration of a Selected Node operation, processing requirements may be further reduced.

In accordance with principles of inventive concepts, data structures initialized in this step (that is, step 302) include a candidate set, a selected set, and a selected node. The selected node is the node that is currently being developed. That is, in the first iteration of steps 304 through 310 of the process 301, the selected node is the starting node, during the second iteration the selected node is the selected in the previous loop, etc. The selected set includes nodes that have been selected during previous iterations of steps 304-310 during execution of the process 301. The candidate set includes all the nodes never selected (from among all nodes within the discretized geographic region), and that could still be selected in future iterations.

The chart of FIG. 3B illustrates an exemplary embodiment in which start and end points have been selected by a user to navigate around the island of Sardinia and an automatic navigational router in accordance with principles of inventive concepts has initialized data sets. The data sets have been initialed, as described above, with the Candidate Set and Selected Set of nodes initialzed as empty, and the Selected Node is the node, indicated as the Start node by a user. The automatic navigational router defines a geographical search space, for example, the geographical space indicated by the rectangular outline 3B1 in FIG. 3B, within which to find a path from the start node to the end node.

Returning to FIG. 3A; from the initializations of step 302, the process 301 proceeds to step 304, where the automatic navigational router in accordance with principles of inventive concepts selects a sub-region around the Selected Node within the geographic area which encompasses the selected start and end points. As previously described, the Selected Node is the Starting Node at the beginning of the automatic routing process. Cartographic vectorial data in the sub-region around the Selected Node is analyzed according to navigation rules (for example, avoiding areas of restricted access, such a militarily restricted areas, or area where the user's boats characteristics indicate the boat would be unable to navigate) to develop a set of points, referred to as points of visibility (POV), which are used in the node path development. The chart of FIG. 3C highlights the exemplary sub-region 3C1.

Figure 3D:
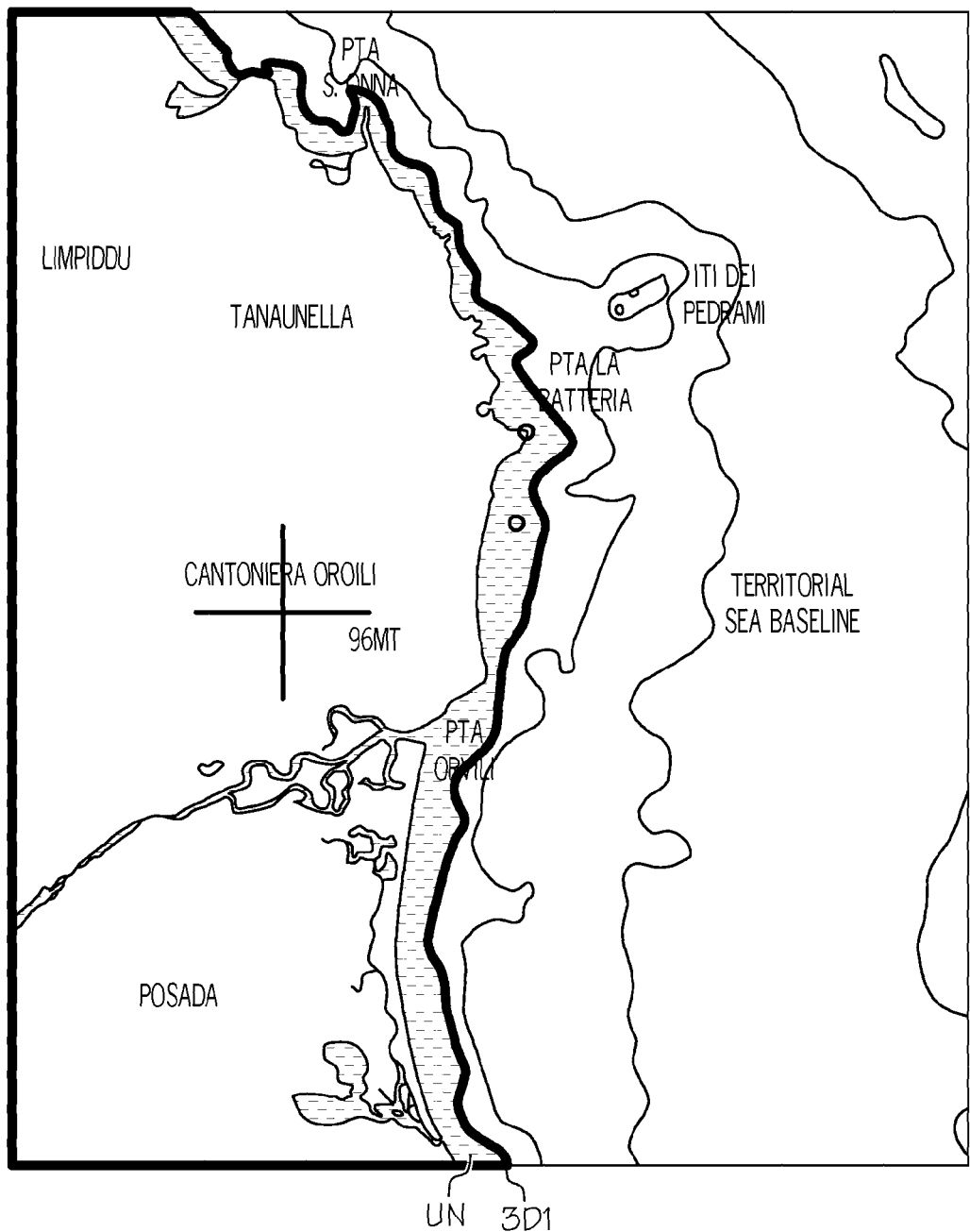

In accordance with principles of inventive concepts, the points of visibility are developed by retrieving vectorial data related to the subregion 3C1 from cartography according to a set of navigation rules. The retrieved vectorial data is then rasterized in order to reduce data complexity. The rasterized vectorial data is then interpreted to extract a geometry meaningful for navigation (that is, geometry that separates navigable from non-navigable regions) in an exemplary embodiment in accordance with principles of inventive concepts. For example, the heavy line 3D1 of FIG. 3D depicts a region that is potentially navigable by the user's vessel. From the extracted/simplified geometry the automatic navigational router in accordance with principles of inventive concepts then extracts a set of points, points of visibility, that is optimized to minimize, or reduce, the number of points that retain all the important features of the geometry previously extracted. The set many also be further compressed (for example, by ignoring points dividing a lake from land if the user's start and end points are in open sea).

Figure 3E:
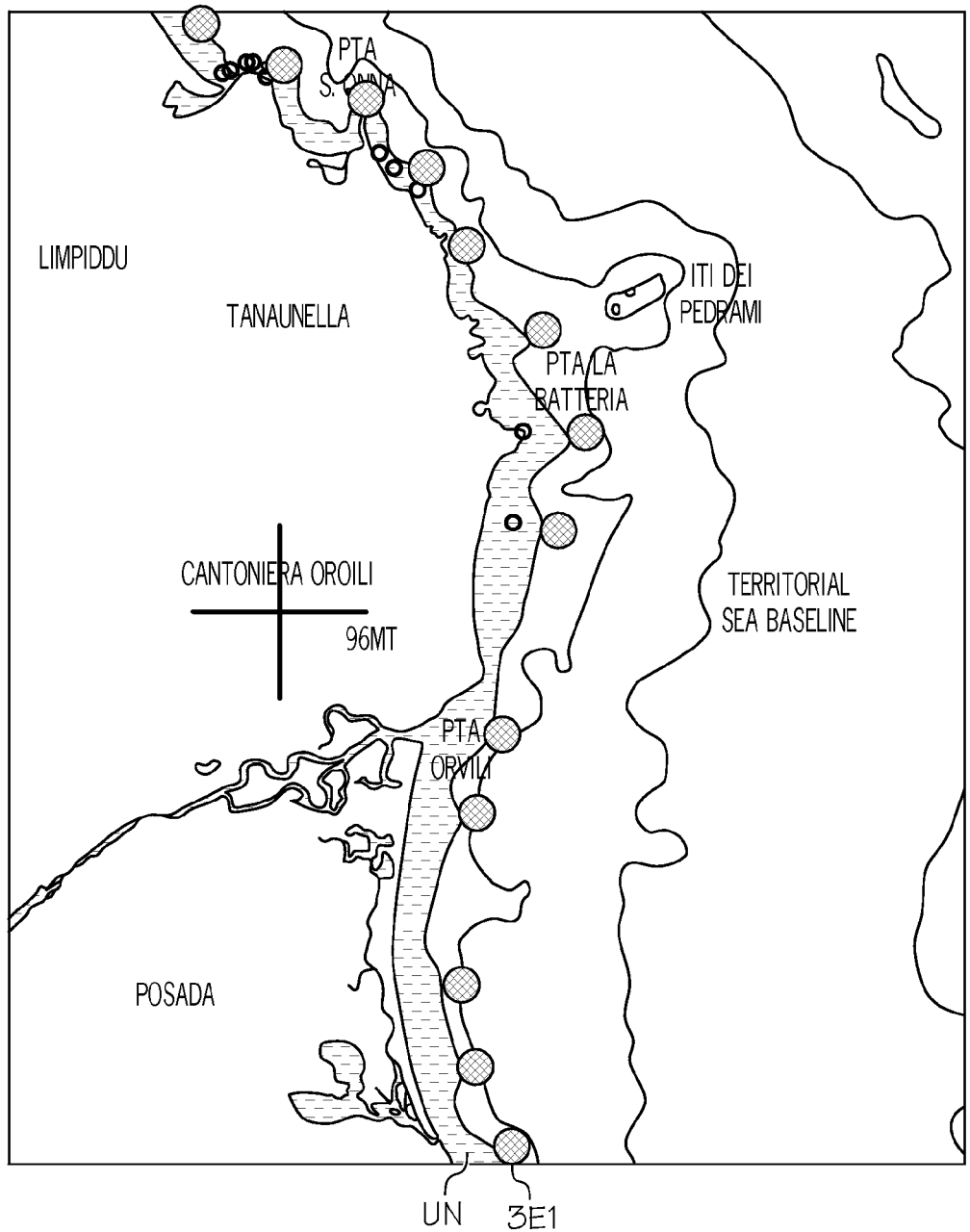

From step 304, where points of visibility are developed, the process proceeds to step 306 where points of visibility are developed into a set of candidate nodes, as illustrated, for example, in FIG. 3E by candidate nodes 3E1. A navigational router in accordance with principles of inventive concepts develops a subset of links between the set of points of visibility previously developed and the Selected Node (e.g., the Start Node, at the beginning of the process). To decide which links to create, in accordance with principles of inventive concepts the costs of navigation are analyzed based on an evaluation process, which determines the cost of reaching the candidate node from the Selected Node. A potential link is checked against the raster data of the cartography and only created if the Selected Node can "see" the node that would form the other endpoint of the link. That is, the link is only formed if no navigational obstruction lies between the Selected Node and the point of visibility node in question. For each node in the point of visibility set, the cost of navigation to the Selected Node is analyzed. If a link is successfully formed between the Selected Node and a point of visibility node, the related point of visibility node is added to the candidate set of nodes.

Figure 3F:
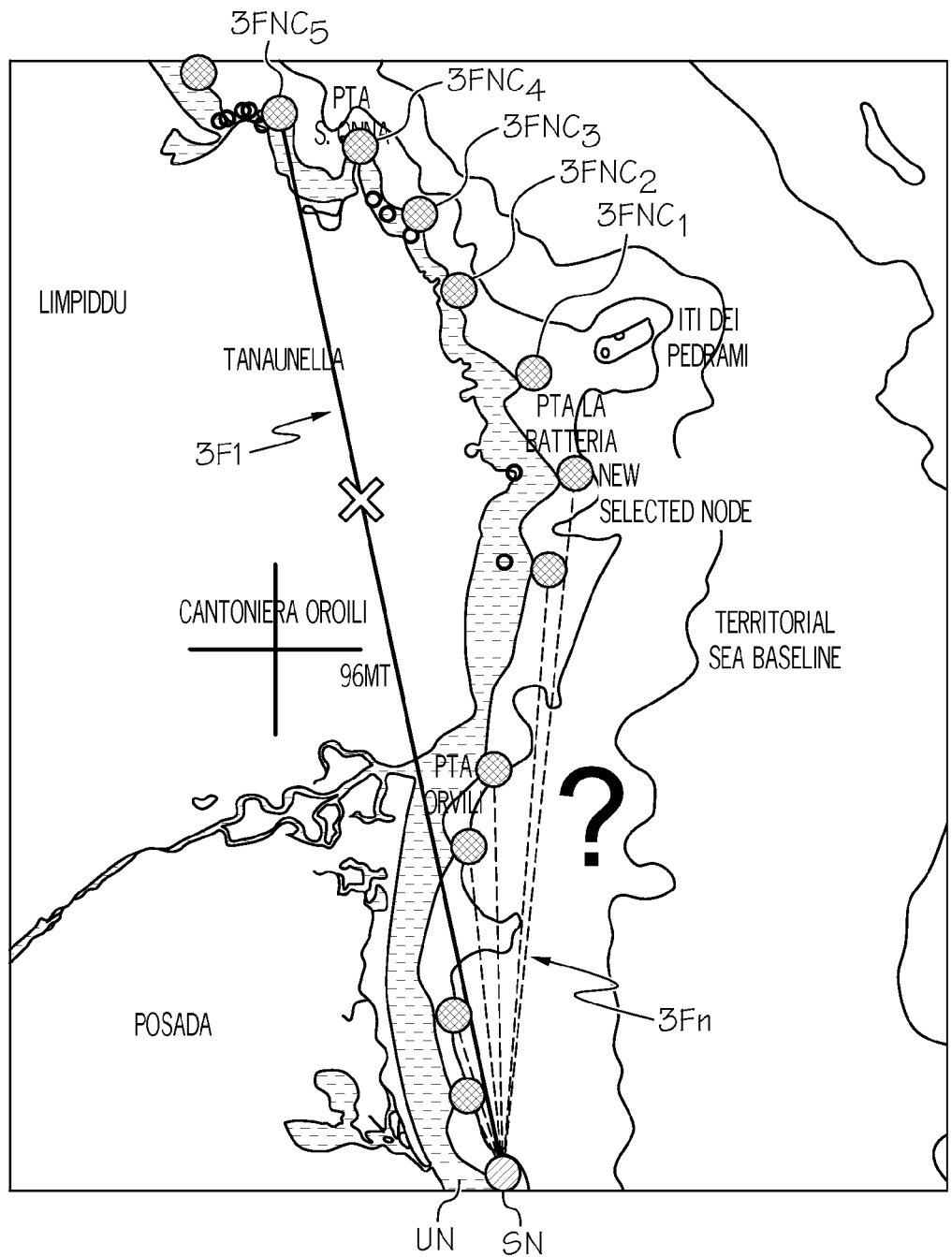

The chart of FIG. 3F depicts this development of a candidate set of nodes through the formation of links. For example, failed link 3f1 is not "navigably visible" to Selected Node SN (that is, a portion of the island of Sardinia intervenes), so the node at the distal end of failed link 3f1, and those at the distal ends of other failed nodes within the selected subregion, are not added to the candidate set of nodes. As previously indicated, in accordance with principles of inventive concepts, a region UN too shallow, or otherwise un-navigable, borders the land (Sardinia, in this exemplary embodiment), and a potential link that passes through that region UN would fail too (that is, would not be navigably visible) and, as a result, nodes associated with those potential links will not be included in the candidate set of nodes. For example, although land does not intervene between node 3FNC1 and Selected Node, the line that would link Selected Node and node 3FNC1 would pass through the un-navigable region UN and, as a result, node 3FNC1 is not navigably visible to the Selected Node and is not, therefore, a member of the candidate set associated with this, the current, Selected Node. On the other hand, links 3fn do not fail; they are navigably visible to Selected Node SN and, as a result, the nodes at the distal ends of links 3fn are added to the candidate set of nodes.

Figure 3G:
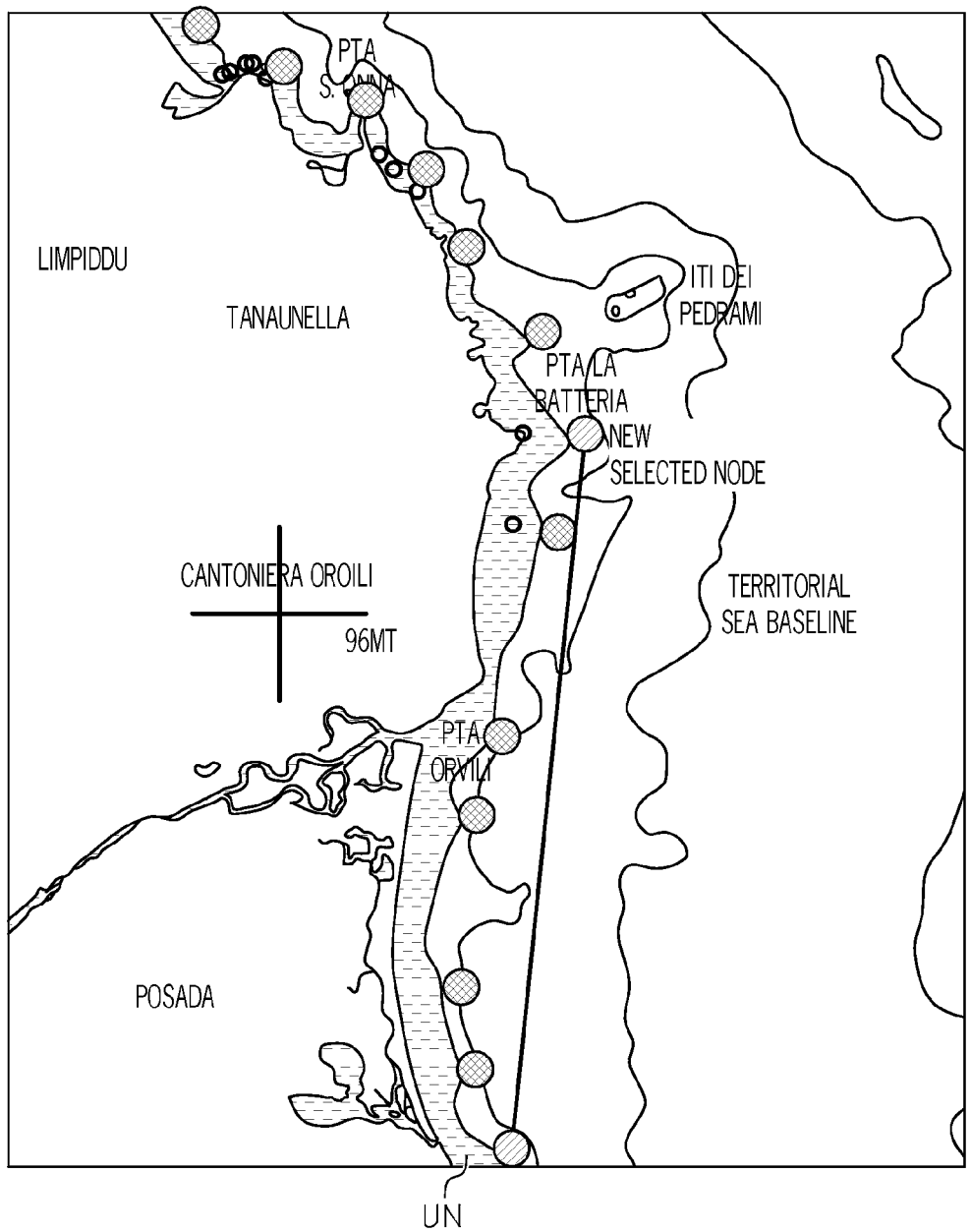

Returning to FIG. 3A, the process proceeds from step 306, where candidate nodes related to the current Selected Node are developed, to step 308 where the new, or next, Selected Node is chosen from among the set of candidate nodes. In accordance with principles of inventive concepts the chosen node may be the one associated with the lowest cost from the Selected Node, as determined during the link-creation process, and which also minimizes the linear cost to the End Node. The newly chosen Selected Node is depicted in the chart of FIG. 3G.

Returning to FIG. 3A, the automatic navigational router proceeds from step 308 to step 310 where it determines whether the new Selected Node is the End Point. If the newly chosen Selected Node is not the End Point, the automatic navigational router determines whether an upper threshold has been reached and, if not, returns to step 304 and proceeds from there as previously described, using the newly chosen Selected Node as the basis for developing candidate nodes and selecting among those candidates. On the other hand, if the threshold has been exceeded, the automatic navigational router indicates to the user that the route could not be developed. The use of an upper threshold is optional, but, generally, a navigational router in accordance with principles of inventive concepts may include a feature that permits the process to "time out," and, in accordance with principles of inventive concepts, the timeout feature may be adjustable by a user, for example.

Figure 3H:
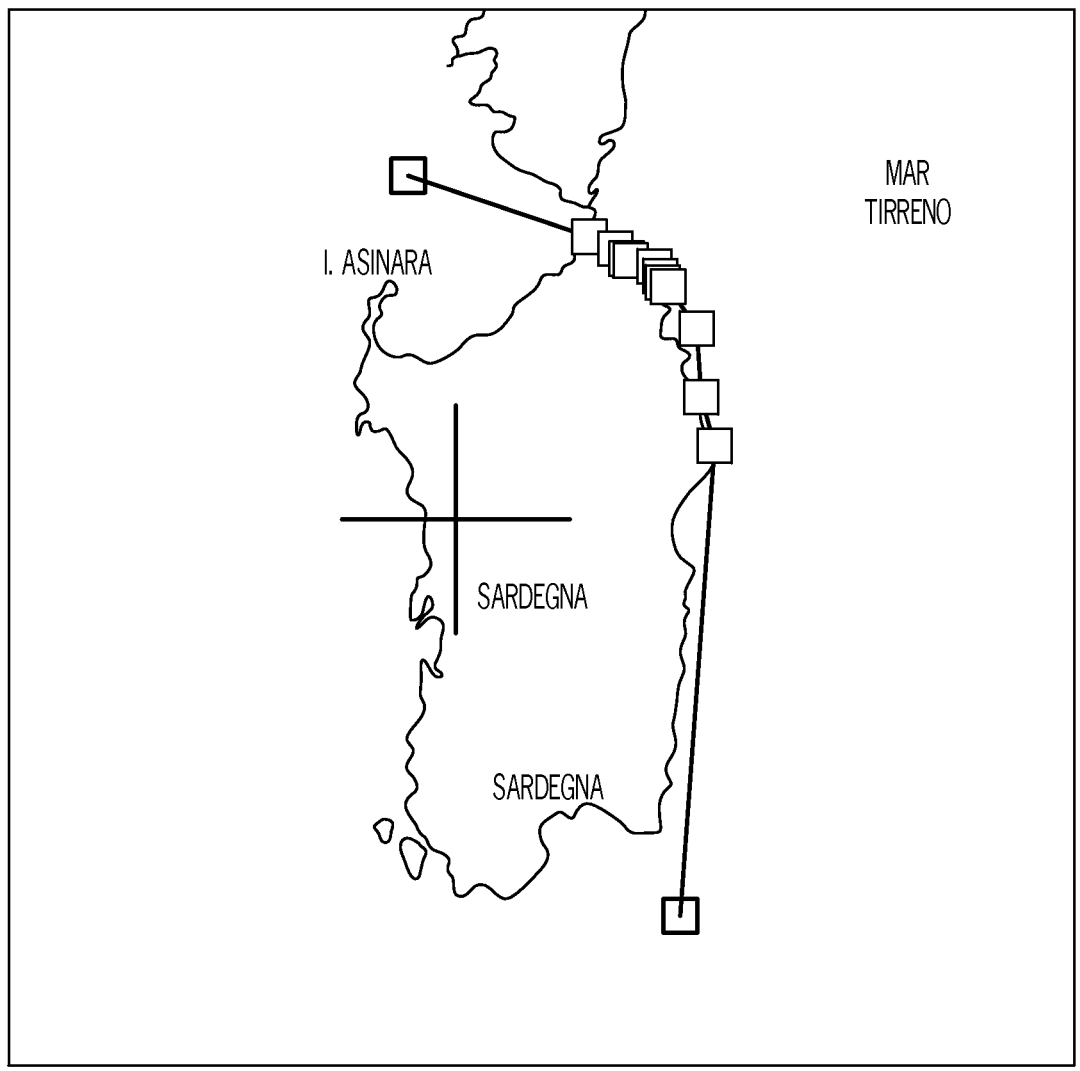

In accordance with principles of inventive concepts the threshold may be set at a relatively high number of iterations, but low enough to prevent router processing that may require a user to wait too long. In accordance with principles of inventive concepts a user may select a different End Point, closer to their Start Point, allow the automatic navigational router to develop a route between that closer End Point and their Start Point, store the route developed between those points, and then have the automatic navigational router develop a route to their original End Point from the closer End Point: that is, break the route into component routes. If the iteration threshold is not exceeded the End Point will be reached and the completed route will be built, from the End Node back through Selected Nodes to the Start Node in step 312 and from there to end in step 314. Path completion in accordance with principles of inventive concepts is depicted in the chart of FIG. 3H.

In accordance with principles of inventive concepts a navigational router may develop and display routing information as illustrated in the exemplary screenshots of FIG. 4A through 4J. The three screenshots of FIG. 4A include an upper level screen 4Ai that allows a user to navigate to a boat settings screen 4Aii and, from there to a specific boat setting screen 4Aiii. Screen 4Ai includes displays of a "safety depth" 400 (which, in accordance with principles of inventive concepts is not used in automatically developing a route), distance selection bar 402 (giving a user the option, for example, to display distances in kilometers, nautical miles, or miles), an "easy view" option that, for example, improves the readability of the cartographic information by enlarging text and symbols, a boat settings 406 bar that allows a user to enter into the navigational router system information relative to his boat, a compass display bar 408, allowing a user to opt for the use of either a magnetic or true compass, and a community layer bar 410 that, when activated, allows a user to contribute information to a community of users by, for example, adding or editing the locations of map objects, point obstructions, or the like, for example.

In accordance with principles of inventive concepts, an automatic navigational router may employ information characterizing a user's boat in the process of automatically determining routes for the boat. To that end, a user may activate the boat settings bar 406 of screen 4Ai to navigate to boat settings screen 4Aii. The boat settings screen 4aii includes bars 412, 414, 416, 418, and 420 that allow a user to respectively enter his boat's draft, height, width, cruising speed, and fuel consumption. For example, in accordance with principles of inventive concepts, when the draft settings bar 412 of screen 4Aii is activated a user is presented with screen 4Aiii that allows a user to enter his boat's draft 422. Option bar 424 allows a user to enter the boat's draft in meters, feet, or fathoms. In accordance with principles of inventive concepts the option for draft dimensions may be convenience of display (that is, for displaying draft dimensions in a format the user is familiar with) and to coordinate the boat data with charts employed by an automatic navigational router in accordance with principles of inventive concepts or other navigational tools. A set wheel 426 may be employed by a navigational router in accordance with principles of inventive concepts to allow a user to enter his boat's draft data, for example.

Because a boat's draft may change, depending upon loading for example, and concomitantly, the boat's height (distance above the water line) may also change depending upon loading, an automatic navigational router in accordance with principles of inventive concepts may include a range of values around those entered by a user in order to accommodate different loading situations or, in an alternative embodiment, may use the exact value entered by a user when developing a route. In either case, an automatic navigational router in accordance with principles of inventive concepts may include some margin in the difference between the boat's draft and the water depths provided by cartographic data while developing routes. Tidal information may also be employed to provide a user with routes that reflect tides (and water levels) at specific times and/or at sub-ranges such as, low tide, high tide, and intermediate levels. In accordance with principles of inventive concepts an automatic navigational router may also include information related to historic, political, cultural, recreational, or other points of interest so that a user may employ such information in developing a route. In accordance with principles of inventive concepts, such info nation may allow a user to select a route or a portion thereof from among preselected routes of touristic, scientific, historical, cultural, or other interest. Such routes or route segments may include passages such as inland water routes, for example. In some exemplary embodiments cartographic information is stored in object oriented databases and, as a result, point hazards, such as projecting rocks, for example, may not be accounted for in the database and/or in a routing system that employs such a database. However, such point hazards may be included in a database and avoided by an automatic navigational router in accordance with principles of inventive concepts.

Figure 4A:
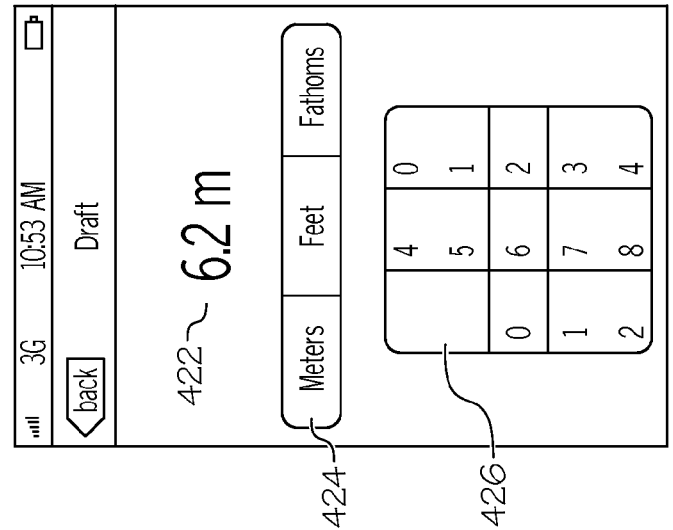
Figure 4A:
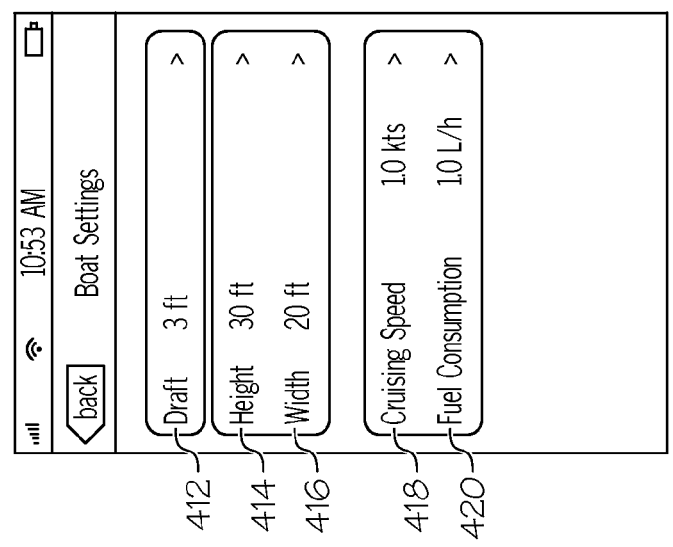
Figure 4A:
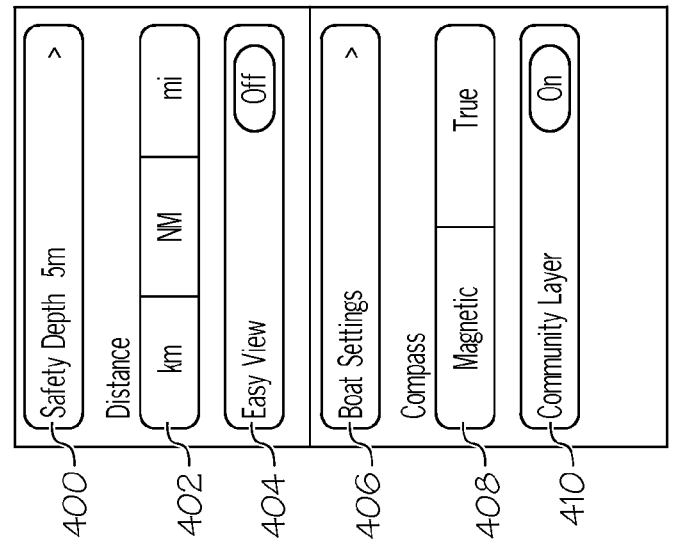
Figure 4B:
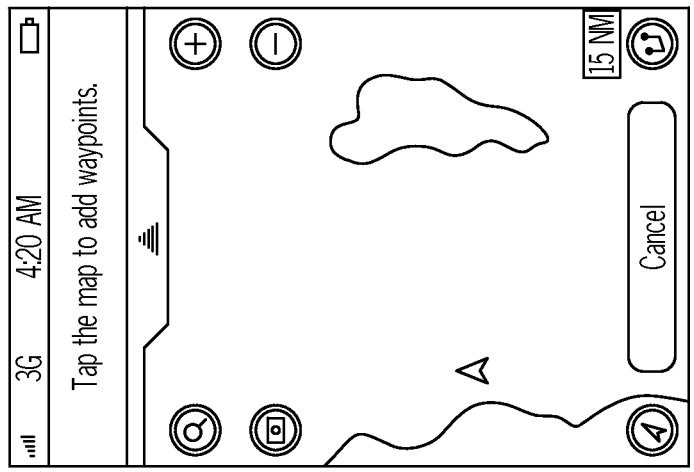
Figure 4B:
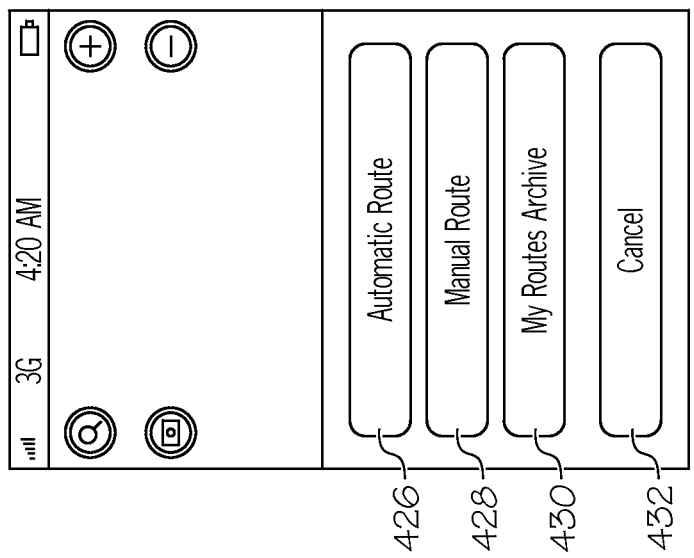
Figure 4B:
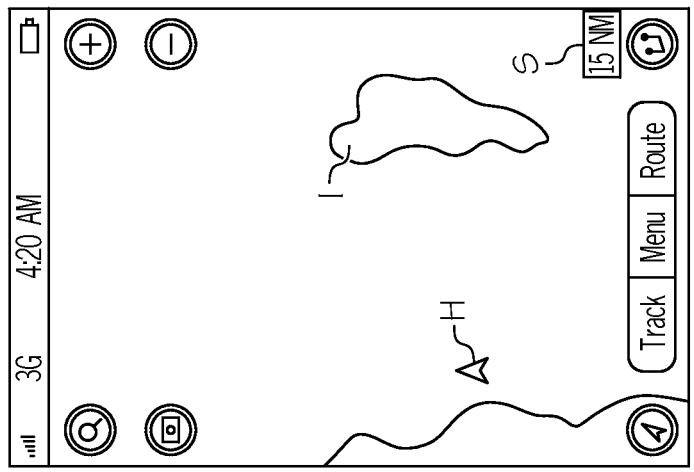
Figure 4D:
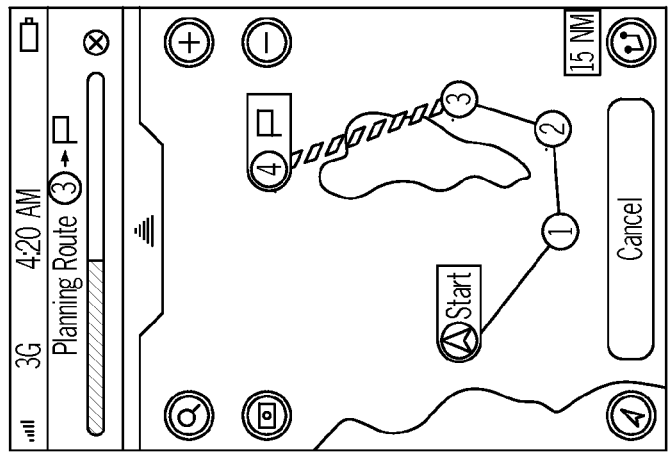
Figure 4D:
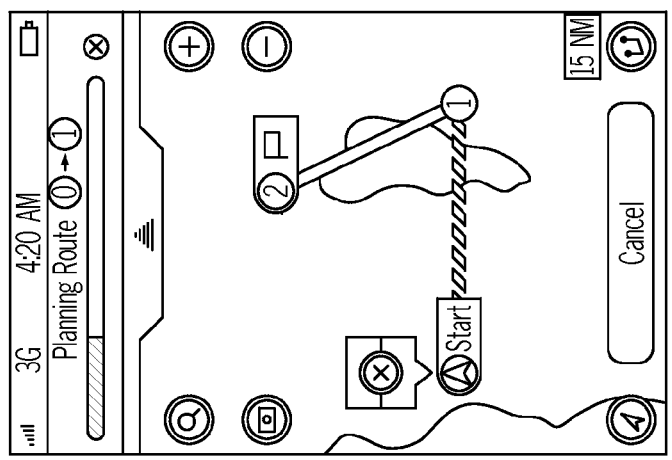
Figure 4D:
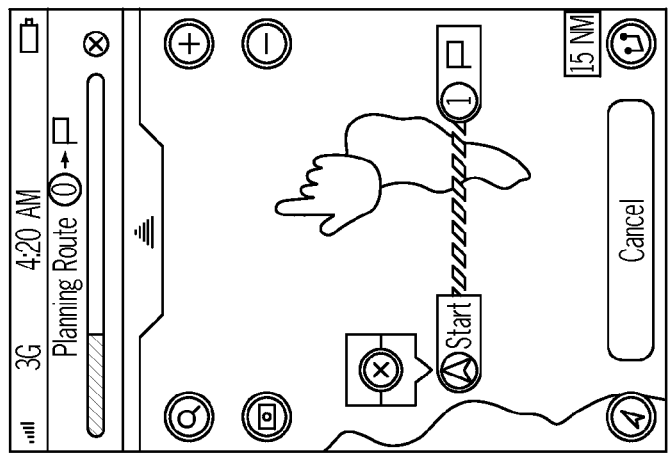

The screen shots of FIG. 4B depict three exemplary screens 4Bi, 4Bii, and 4Biii in accordance with principles of inventive concepts that respectively illustrate: a main screen, a route selection screen, and routing screen. In the main screen 4Bi an icon H indicates the current location and heading of a user's boat overlaid on a current map that includes a scale S and geographic features, including an island I. In accordance with principles of inventive concepts, the current location and heading may be obtained from, for example, a global positioning system. The global positioning system may provide speed and heading information, in addition to current location information. Compass readings may also be incorporated into the heading information.

A menu bar includes user options for track, menu, and route. The track option tracks and displays the boat's current location and heading (as is illustrated), the menu option allows a user to return to a main menu for further options, and the route option allows a user to generate a route. Other icons, such as, "+", "−," "camera," and "lens" (for searching), "signal strength," and "battery level" may be standard icons related to the operation of a portable electronic device, such as a tablet computer or smart telephone, upon which a navigational router in accordance with principles of inventive concepts may operate. In this exemplary embodiment, a user activates the route option, by "clicking" or "double-clicking" (depending upon the platform's user interface) on the route icon in the menu bar. The resulting screen 4Bii displays options for automatic routing 426, for manual routing 428, for accessing an archive of previously developed and stored routes 430, or to cancel the operation 432. If a user opts for automatic routing, the router in accordance with principles of inventive concepts displays screen 4Biii and prepares to automatically develop a route for the user.

Although the following FIGs and discussion related thereto will largely be dealing with automatic routing, many of the features, including display features, are also available in a manual router in accordance with principles of inventive concepts. FIG. 4C includes three screens; 4Ci, 4Cii, and 4Ciii, that respectively display a screen that may be displayed immediately after automatic routing has been chosen by a user, a screen including start and end points of a route, and a screen that displays a completed route. In accordance with principles of inventive concepts, a user can add waypoints by tapping, or otherwise selecting, a location on the map, and the automatic navigational router, in addition to accommodating the added waypoint, will provide immediate animated feedback to the user regarding the progress of the route's development.

As illustrated in screen 4Cii, in an exemplary embodiment, during development of a route, the automatic navigational router may default to the current location of the user's routing system, which may be provided by a global positioning system. However, a user may delete that default starting waypoint, by tapping on a delete icon 434 (an "X" in the screen shot), and then plan their route starting from another location. Because, in accordance with principles of inventive concepts, routes may be stored, a user may develop a route starting at a starting point other than their current location, save the completed route, then employ the completed route at a future time when they have arrived at the selected start point. While the route is being developed, a leg that is being processed 436 may be displayed in a manner that distinguishes it from other legs, such as completed legs. In the exemplary embodiment of screen 4Cii, the leg may be displayed in a broken line and may also be of a color that corresponds with legs that have been successfully developed. A progress bar 438 provides an indication of the progress being made by the automatic navigational router in developing the route. A leg icon 440 may be used to indicate which leg of a route is currently being developed. In this exemplary embodiment, the leg from the start point "0" to the endpoint, indicated by a checkered flag, is under development.

When a route is completed, the display proceeds to screen 4Ciii, where completed legs from start to waypoint 1 and from waypoint 1 to endpoint are displayed. Additionally, in area 442 the distance of the first leg, forty nautical miles in this exemplary embodiment, is displayed. The total estimated time to follow the route, based on the boat's speed entered earlier by a user, is displayed in region 444. Another region 446 displays the total distance, from the first point to the endpoint.

If a user wishes to add or edit waypoints while still in a planning mode, that is, while the automatic navigational router is in the middle of developing a route, they can do so by tapping on the map displayed by the navigational router. Waypoints added manually by a user during "planning" or, as is also referred to herein, route development, are incorporated by the automatic navigational router on-the-fly. In accordance with principles of inventive concepts a user may move, add, or delete waypoints, even as the automatic navigational router develops a route, and the router accommodates the newly input (or deleted) waypoints. Such a process is illustrated in greater detail in screens 4Di, 4Dii and 4Diii of FIG. 4D. Screen 4Di illustrates a screen where two waypoints have been selected, similar to previously-described screen 4Cii. In accordance with principles of inventive concepts a user can manually add another waypoint, as illustrated by the addition of waypoint 2 in screen 4Dii. As depicted by screen 4Diii waypoints 1 and 2 may be developed by the automatic navigational router in order to reach the first endpoint input by a user, now waypoint 3, and the automatic navigational router continues to develop waypoints in order to reach the new end point 4, entered by the user as a route was being developed to the first endpoint.

In accordance with principles of inventive concepts a navigational router may display legs using different colors, patterns, or other features in order to signify different attributes of a leg. FIG. 4E illustrates exemplary embodiments of different such indicators, with a dashed blue pattern signifying a leg that is being developed, a continuous 50% black, also referred to herein as grey, line indicating that the leg is awaiting calculation, or development, a continuous blue line indicating a leg that has been successfully developed, and a continuous red line indicating a leg which has "failed." By "failed," we mean a line that transits a "non-navigable" region, according to cartographic information. As will be described in greater detail in the discussion related to the following FIGs, in accordance with principles of inventive concepts, a user has the freedom to override the automatic navigational router to include a "failed" leg in their route. Such a feature may be useful, for example, if the user is particularly aware of a region that cartographic data would indicate is un-navigable, given the user's boat's information, and the user knows that, for example, a bridge may open to accommodate a boat having a mast as high as that of their boat, or that a particular water features was obliterated during a recent storm, for example.

Figure 4F:
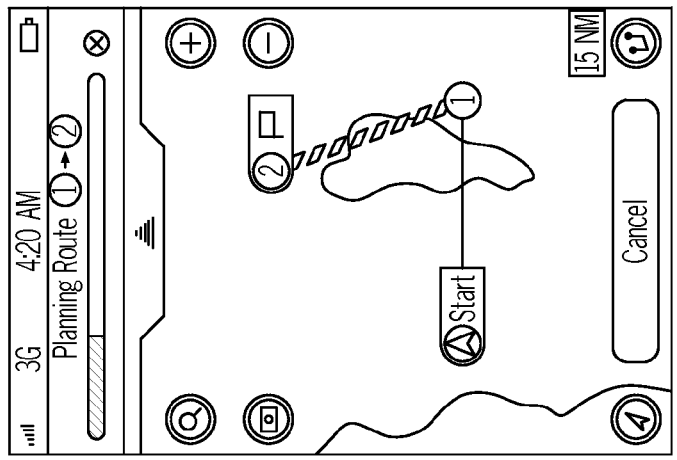
Figure 4F:
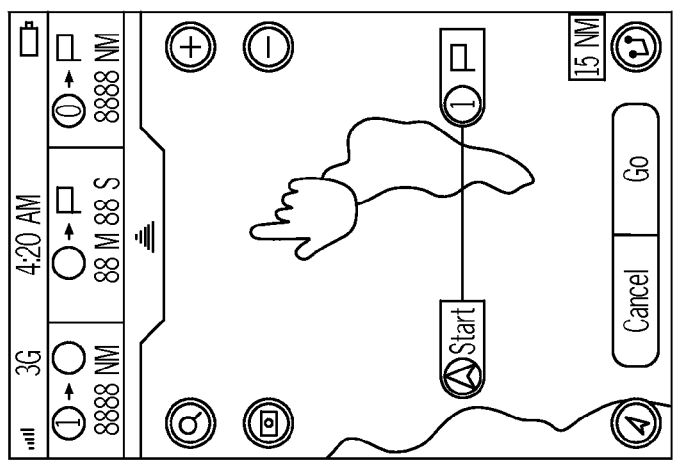
Figure 4F:
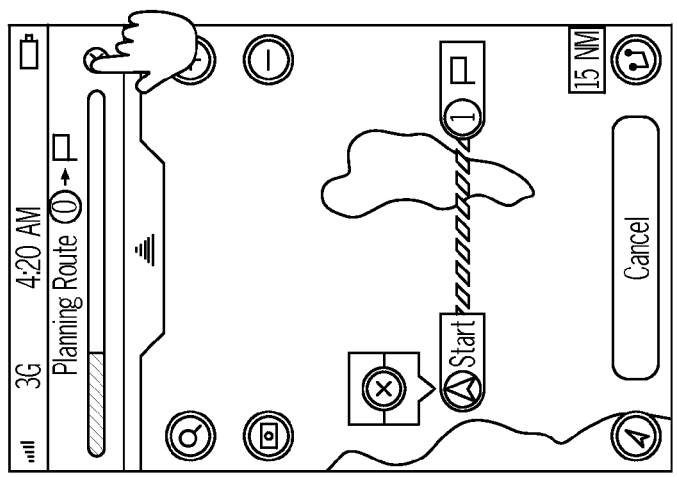

As indicated in screens 4Fi, 4Fii, and 4Fiii of FIG. 4F, in accordance with principles of inventive concepts, a user may interrupt a route development at any time by tapping the "X" in the progress bar (screen 4Fi), allowing the user to view other screens (screen 4Fii), and return to route development (screen 4Fiii) at any time.

Screens 4Gi 4Gviii of FIG. 4G illustrate a way in which a user may edit their route from the planning phase (corresponding to steps 302 through 310 of FIG. 3A) in a navigational router in accordance with principles of inventive concepts. Editing may be carried out in a variety of ways and the route may be re-developed or left intact, depending upon the state of the preceding or subsequent legs. Screens 4Gi through 4Giii depict the addition of a new endpoint, as previously described in the discussion related to FIG. 4D, for example. Screens 4Giv and 4Gv depict the movement of a waypoint, waypoint 2 in this example, from one location to another, and the navigational router recalculating the leg from waypoint 1 to new waypoint 2 and preparing to redevelop legs from waypoint 2 on, as necessary (for example, the leg from waypoint 3 to waypoint 4, which was already developed, need not be redeveloped). In accordance with principles of inventive concepts, legs may be "rubber-banded" in the display to illustrate the navigational router's accommodation of the new placement of a waypoint.

Screens 4Gvi to 4Gvii depict the elimination of waypoint 3, for example. In accordance with principles of inventive concepts, a navigational router may connect the preceding and following waypoints (in an exemplary embodiment, the automatic navigational router does not redevelop that leg), and the leg is displayed in a manner that distinguishes it, for example, by displaying it as a solid red line.

Figure 4H:
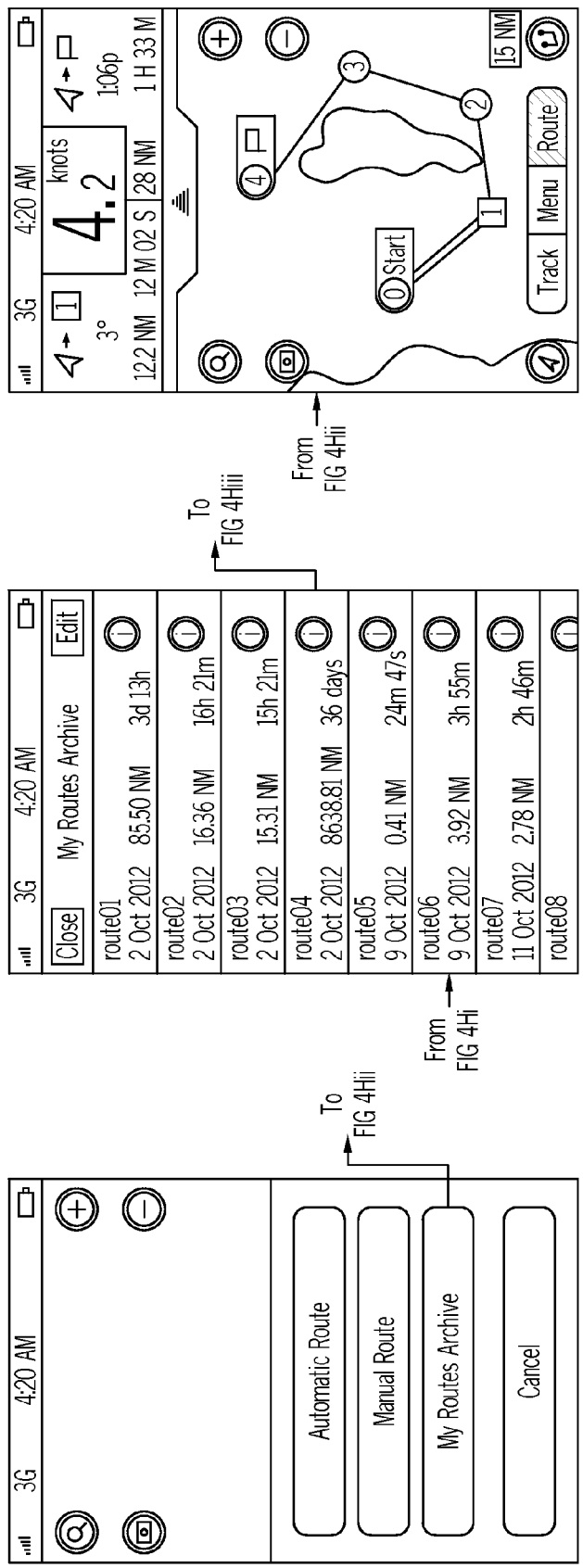

FIG. 4H includes screens 4Hi, 4Hii, and 4Hiii that illustrate the manner by which, a navigational router in accordance with principles of inventive concepts may allow a user to store and retrieve routes directly from a route menu. Previously described screen 4Hi includes the options for automatic route development, manual route development, and a route archive. When the route archive button is activated, an archive of routes may be displayed, as in screen 4Hii. A user may then select one of the stored routes to display the route, as in screen 4Hiii.

FIG. 4I includes screens 4Ii, 4Iii, and 4Eii, which illustrate how an exemplary embodiment of a navigational router in accordance with principles of inventive concepts may allow a user to edit a route, either manually or automatically. Screen 4Ii depicts a route retrieved from a user's archive, as described in the discussion related to FIG. 4H. Screen area 448 includes icon that indicates the data within the region relates to the leg from start to waypoint 1. In this exemplary embodiment the heading information for this leg is 3 degrees, which is the angle of the segment linking the current boat position with the nearest waypoint combined with the North direction, the leg is 12.2 nautical miles in length and the time to traverse this leg is twelve minutes and two seconds (travelling at 4.2 knots as indicated in region 450). Region 452 displays similar information for the total route (that is, 28 nautical miles and one hour and 33 minutes and estimated time of arrival 1:06 pm) when a user activates the route button screen, 4Iii is displayed, affording a user the option of editing the route. When a user activates the edit button, screen 4Iiii is displayed giving the user the user the option of editing either manually or automatically.

As briefly described earlier, a user may manually place a waypoint in a prohibited area. Such an occurrence is depicted in screens 4Ji and 4Jii of FIG. 4J. In screen 4Ji a user moves waypoint 1 into a non-navigable area, the center of an island. The router notifies the user of the legs that are non-navigable (both legs in this example) by highlighting the legs by coloring them a solid red, for example. The user may use the legs or move the waypoint ("1" in this example) to an area that allows the automatic navigational router to redevelop a route. Although not show in this illustrative example, it may be that a user has particular knowledge about a region that is superior, or more recent, than the cartographic data associated with charts used for routing. In such a situation a user may want to navigate through a region that the charts indicate is non-navigable by his boat, but which the user knows is now navigable. There may be instances when a navigational router in an exemplary embodiment in accordance with principles of inventive concepts is unable to complete an automatic routing after a threshold number of iterations, as previously described. In such a case, the router will provide an indication of such a failure to the user and the user then may attempt a different route; one that, for example does not include as many obstacles as his first selected route. In order to accommodate limited storage capacity or processing power, a navigational router in an exemplary embodiment in accordance with principles of inventive concepts may limit the number of waypoints in a route. If, during the course of calculating a route, the navigational router meets the threshold number of waypoints, the navigational router may indicate such to the user and invite the user to edit the route, allowing the user to, for example select one of the already-developed waypoints as the new endpoint. The router may then finish the route without exceeding the threshold; the user may store the abbreviated route; and the user may then create another route from the modified endpoint to the original endpoint, for example. In accordance with principles of inventive concepts if a user attempts to automatically route into a region where he does not have map coverage, that is, he does not have cartographic data related to the region, he will be prompted to download the necessary cartographic data.

Figure 4K:
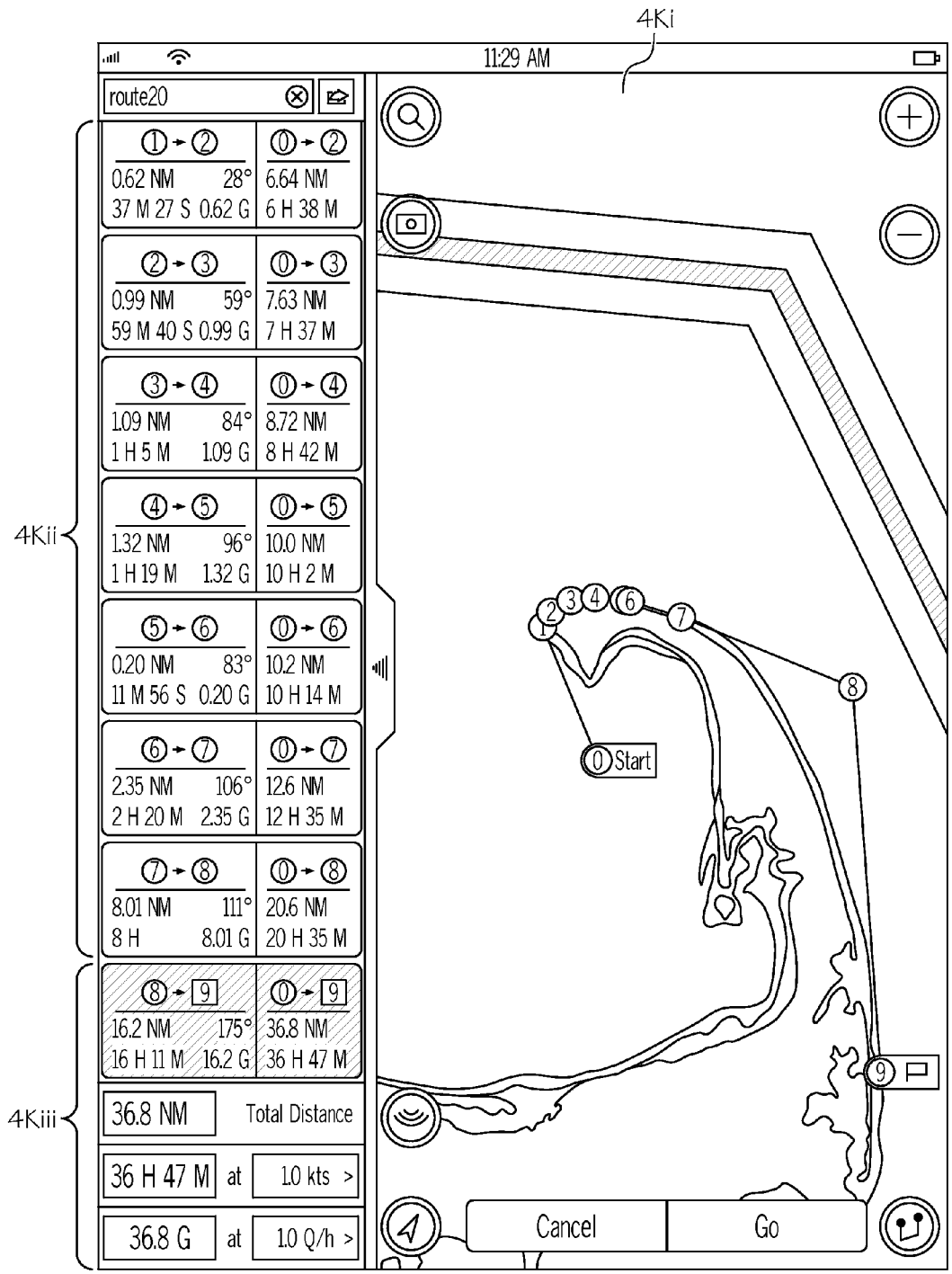

The screen of FIG. 4k is an exemplary screen in accordance with principles of inventive concepts that provides a detailed view of a completed route (in this example, from within Cape Cod Bay at start point 1 to end point 9 off Orleans). As can be seen from this view, displayed maps may include cartographic data, such as water depths 4ki, depth contour lines, and other features that may typically be found on navigational charts. In this exemplary embodiment, detailed information related to each leg of a route (labeled "route 20" in this example) is displayed along the left of the screen in a series of blocks 4Kii. Each block includes detailed information, as previously described, related to a specific leg of the route. Detailed information related to the entire route, as previously described, may be contained in blocks 4Kiii (although, in the exemplary screen, in an intermediate step, blocks 4Kiii display information for the last section of 4kii). In some embodiments, the detailed leg information and route information available in blocks 4Kii and 4Kiii can be made visible and invisible to the user with the use of a display slider that the user can control.

Although details of a navigational router in accordance with principles of inventive concepts has been described, largely, in the context of automatic routing operations, manual routing in may employ substantially the same features, particularly as they relate to the display of route information. The primary differences between automatic and manual routing in accordance with principles of inventive concepts is that in manual mode a user may add waypoints wherever he chooses, including non-navigable areas, such as land, but no boat settings may be available to a user for route development. Additionally, in exemplary embodiments intermediate waypoints, which may be added during automatic routing (for example, to route around a non-navigable region), will not be automatically added in a manual mode. As previously discussed, in accordance with principles of inventive concepts, any stored route may be edited using either a manual or automatic routing mode. In this manner, a route created manually may be edited using automatic routing or manual routing and a route created automatically may be edited using automatic routing or manual routing.

Figure 5:
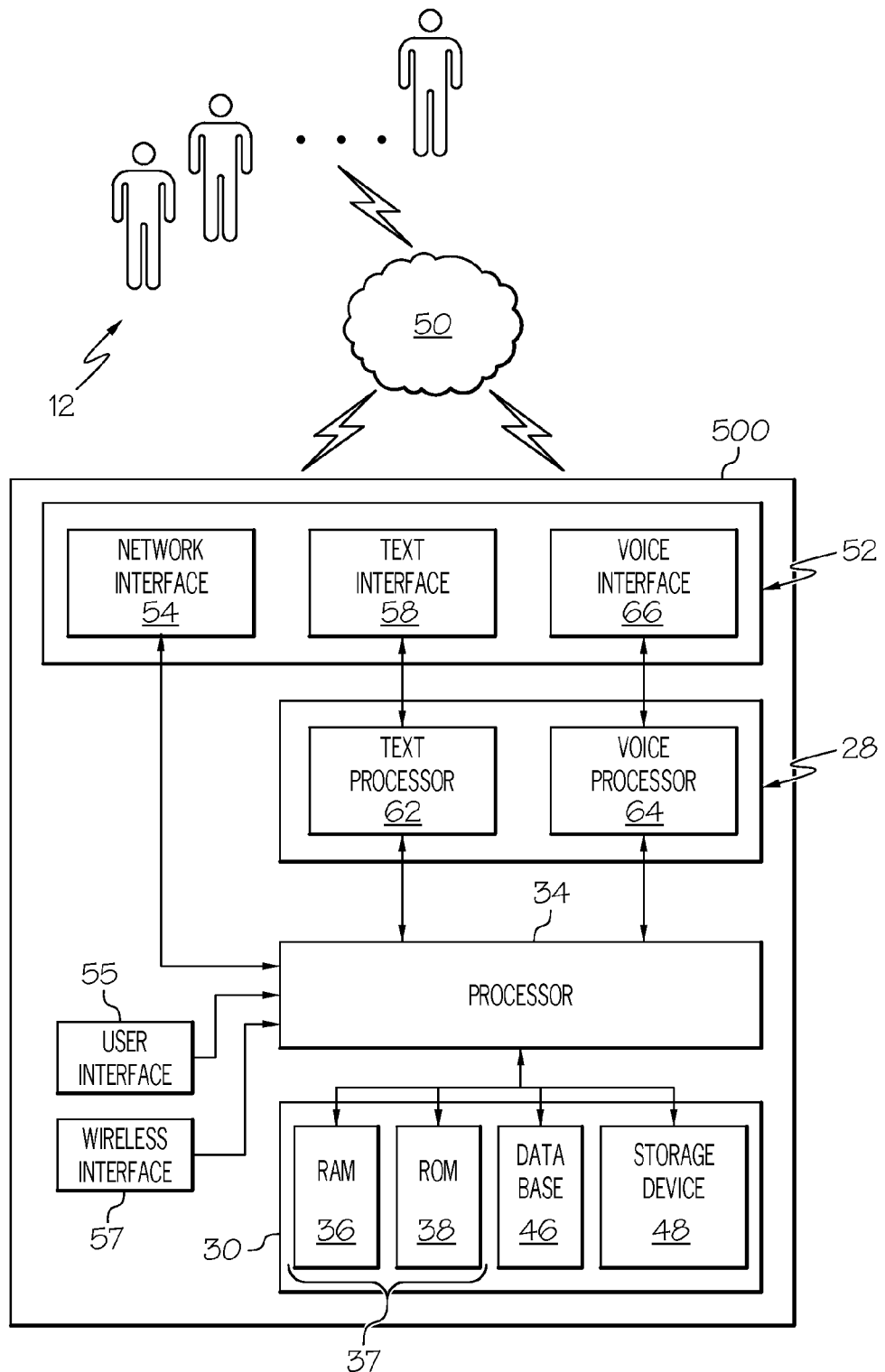
FIG. 5 is a block diagram of an exemplary electronic system which may develop a navigational route in accordance with principles of inventive concepts.

FIG. 5 is an exemplary block diagram of a processing system 500 within which a navigational router (see, for example, FIG. 1) in accordance with principles of inventive concepts may be implemented. The processing system may included in a personal digital assistant (PDA), a cell phone, a computer, a laptop, a tablet, a terminal, or any other suitable electronic device, whether wired or wireless, for example. The processing system 500 includes at least one processor 34 (e.g., a central processing unit (CPU)) that stores and retrieves data from an electronic information (e.g., data) storage system 30. As will be appreciated by those skilled in the art, while processing system 500 is shown with a specific set of components, various embodiments may not require all of these components and could include more than one of the components that are included, e.g., multiple processors. It is understood that the type, number and connections among and between the listed components are exemplary only and not intended to be limiting.

In the illustrative embodiment, processor 34 is referred to as CPU 34, which may include any of a variety of types of processors known in the art (or developed hereafter), such as a general purpose microprocessor, a bit-slice processor, a digital signal processor or a microcontroller, or a combination thereof, for example. CPU 34 may be operably coupled to storage systems 30 and configured to execute sequences of computer program instructions to perform various processes and functions associated with the navigational router, including the storing, processing, formatting, manipulation and analysis of data associated with the navigational router (e.g., cartographic data, user input, boat specifications, etc.). The computer program instructions may be loaded into any one or more of the storage media depicted in storage system 30.

Storage system 30 may include any of a variety of semiconductor memories 37, such as, for example, random-access memory (RAM) 36, read-only memory (ROM) 38, a flash memory (not shown), or a memory card (not shown). The storage system 30 may also include at least one database 46, at least one storage device or system 48, or a combination thereof. Storage device 48 may include any type of mass storage media configured to store information and instructions that processor 34 may need to perform processes and functions associated with the navigational router. As examples, data storage device 48 may include a disk storage system or a tape storage system. A disk storage system may include an optical or magnetic storage media, including, but not limited to a floppy drive, a zip drive, a hard drive, a "thumb" drive, a read/write CD ROM or other type of storage system or device. A tape storage system may include a magnetic, a physical, or other type of tape system.

While the embodiment of FIG. 5 shows the various storage devices collocated, they need not be as they could be remote to each other, to processor 34 or both. Storage system 30 may be maintained by a third party, may include any type of commercial or customized database 46, and may include one or more tools for analyzing data or other information contained therein. In particular, database 46 may correspond, all or in part, to a cartographic database, and may include tools for matching cartographic data to locations, whether past, present or future, of a user's vessel, and relating that information to navigational systems, as previously described.

In various embodiments, data storage system 30 may be configured to store data representative of the users 12 (and their boats). Data representative of users 12 may include data that is not specific to the navigational router, such as a name, a delivery address, a zip code, a credit card number, a social security number, a phone number, an email address, or a combination thereof, as examples. Data representative of a user may include data associated with the user and the navigational router, such as, type of boat, boat draft, boat height, boat beam, boat weight, a username, a password, a user rating or ranking, a user comment, a member or account number, an access code, community comments regarding navigation, and so on.

As an example, database 46 may include any hardware, software, or firmware, or any combination thereof, configured to store data. Specifically, database 46 may be configured to store data and information representative of one or more of the plurality of users 12, their boats, and cartographic and navigational information. In some embodiments, database 46 may include one or more fields, wherein a field may be an element of a database record in which one piece of information may be stored. In particular, a field may be configured to store an element of data representative of one or more of the users 12.

In some embodiments, one or more storage device in the data storage system 30 (e.g., database 46) may be configured to store cartographic or route data, or other data associated with the navigational router. Data associated with the navigational router 100 may be stored in storage system 30 using any suitable database format, such as, for example, a relational database, a hierarchical database, or any suitable schema. Data storage system 30 may be configured to store information in a format configured to enhance operations of CPU 34 or other functions of the navigational router.

Processing system 500 may include or interface with one or more security systems (not shown), configured to at least partially restrict or control access to one or more components of processing system 500. Security systems may include hardware, software, firmware or a combination thereof, such as, for example, a firewall, password protection software, user authentication software, encryption software and the like. In some embodiments, security systems may be configured to limit a function of the navigational router, limit access to data associated the navigational router, or both.

In some embodiments, processing system 500 may be configured so that select data contained within storage system 30 may be inaccessible to one or more of the users 12.

Processing system 500 may include a network interface system or subsystem 54 configured to enable cartographic data updates, for example. As such, processing system 500 may be configured to transmit or receive, or both, one or more signals related to the functions of the navigational router 100. A signal may include any generated and transmitted communication, such as, for example, a digital signal or an analog signal. As examples, network 50 may be a local area network (LAN), wide area network (WAN), virtual private network (VPN), the World Wide Web, the Internet, voice over IP (VOIP) network, a telephone or cellular telephone network or any combination thereof. The communication of signals across network 50 may include any wired or wireless transmission paths. The navigational router previously described may employ the one or more networks 50, for example.

To enable communications via network 50, processing system 500 may include a set of interfaces 52 and a set of processors 28, 34. The set of processors 28 may include a text processor 62 and a voice processor 64, along with CPU 34. The set of interfaces may include a network interface 54, a text interface 58 and a voice interface 66, as shown in this embodiment. As mentioned above, network 50 may represent a combination of networks configured to transmit and receive communications with processing system 500, via any of the set of interfaces 52.

CPU 34 may be operably coupled to network interface system 54 for exchanging typical computer network information, e.g., via the Internet, a LAN, WAN, VPN or some combination thereof. Network interface system 54 may be configured to permit communication between and among the users 12 and processing system 500, for example using an Internet protocol (IP) or other network-based protocol. In such cases, network interface system 54 may be configured to utilize TCP/IP, HTTP, DNS or any other application, transport, network, or link protocol, or combination of the foregoing.

Text interface 58 may be operably coupled to a text processor 62 configured to process received text message and text messages to be transmitted. Text interface 58 may be configured to permit text-based communication between users 12 and processing system 500.

For example, in combination, text interface 58 and text processor 62 may include functionality to communicate with a two-way pager, a personal digital assistant (PDA), a cell phone, a computer, a laptop, a tablet, a terminal, or any other suitable electronic device, whether wired or wireless. Text processor 62 may include an email system configured to transmit, receive, or process, email messages or a combination thereof. Text processor 62 may also include an instant-messaging (1M) system, a two-way paging system or other system configured to transmit, receive, or process, or a combination thereof, text-based information. As will be appreciated by those skilled in the art, such systems may also provided mechanisms for transferring files between devices. Such files may include any of a wide variety of content.

Voice interface 66 may be operably coupled to a voice processor 64 configured to process received voice information and voice data to be transmitted. Voice interface 66 may be configured to permit voice-based communication between and among the users 12 and processing system 500. For example, in combination, voice interface 66 and voice processor 64 may be configured to enable interaction with a cell phone, a fixed-line telephone, a VOIP device or other similar device, or combinations thereof. For example, voice interface 66 may be configured to transmit, receive, or both digital or analogue signals using wired to wireless communications devices and systems, such systems may include telephone, cellular telephone and VOIP systems, as examples.

In some embodiments, the operable connections between components of processing system 500 may be other than as shown in FIG. 5. For example, data storage system 30 may be operably connected to communication processors 28 or interfaces 52, or both, such that users from the plurality of users 12 may modify data stored in data storage system 30 using such interfaces and processors. User interface 55, which may include one or more displays, including touchscreen displays, for example, may also include keypad, button, or other input devices, including, in some exemplary embodiments, voice interface 66. User interface may be in addition to network interface 50, for example. Wireless interface may include various technologies, such as Bluetooth technologies that permit a user and/or a navigational router to communicate with other devices including navigational devices, for example, and may be in addition to network interface 54.

In various embodiments, systems that may be associated with the navigational router 100 may include one or more systems configured to provide additional functions associated or useful in conjunction with a navigational routing system. For example, systems associated with the navigational router may include a tracking system (not shown) configured to track the current location and/or heading of a device associated with the navigational router.

It is also contemplated that the navigational router may be implemented using one or more processing systems 500. For example, various embodiments of an navigational router may include a plurality of processing systems 500, components of processing system 500, or other systems associated with the navigational router. Heavy usage may, for example, require relatively high computational power to efficiently operate the navigational router.

While the present inventive concepts have been particularly shown and described above with reference to exemplary embodiments thereof, it will be understood by those of ordinary skill in the art, that various changes in form and detail can be made without departing from the spirit and scope of inventive concepts as defined by the following claims.

What is claimed is:

1. An electronic navigational router, comprising:
    an automatic electronic navigational route developer, wherein the route developer employs physical characteristics of a marine vessel in the development of a marine route;
    a location sensor to determine the current location of the navigational route developer; and
    a user interface to accept user input to allow a user to set a start point for the route to be developed, wherein the navigational route developer is configured to employ its current location as a default start point for a route and the user input may redirect the start point to a marine location other than the current location of the electronic navigational route developer, wherein the electronic navigational router employs physical characteristics of the marine vessel to ensure that the redirected start point is navigable by the marine vessel and that a route may be developed from the redirected start point to at least one waypoint, as determined by the electronic navigational router in light of the physical characteristics of the marine vessel;
    wherein the user interface further displays to a user legs of a route using different display attributes according to attributes of a leg of a route;
    wherein one display attribute is used to display a successfully completed leg of a route and a different display attribute is used to display a failed leg of a route.

2. The electronic navigational router of claim 1 further comprising a manual electronic navigational route developer, wherein the user interface further allows a user to select either the automatic electronic route developer or the manual electronic route developer to develop a navigational route.

3. The electronic navigational router of claim 2, wherein the user interface is responsive to user input to edit a route that is currently being developed by the automatic electronic navigational route developer.

4. The electronic navigational router of claim 3, wherein the user interface is responsive to user input to delete a waypoint by deleting the waypoint from the route and directly connecting two waypoints to which the deleted waypoint had been linked.

5. The electronic navigational router of claim 3, wherein the user interface is responsive to user input to add a new waypoint by adding the waypoint, breaking a link between two nearest waypoints, and creating links that connect the new waypoint to the two nearest waypoints.

6. The electronic navigational router of claim 3, wherein the user interface is responsive to user input to move a waypoint by automatically adjusting links between the moved waypoint and its neighboring waypoints to which it is connected.

7. The electronic navigational router of claim 1, wherein the physical characteristic of the vessel is the vessel's beam.

8. The electronic navigational router of claim 1, wherein the physical characteristic of the vessel is the vessel's draft.

9. The electronic navigational router of claim 1, wherein the physical characteristic of the vessel is the vessel's height.

10. The electronic navigational router of claim 1, wherein the physical characteristic of the vessel is the vessel's cruising speed.

11. The electronic navigational router of claim 1, wherein the physical characteristic of the vessel is the vessel's fuel consumption.

12. The electronic navigational router of claim 2, wherein a successfully completed leg of a route is displayed using the attribute of a solid blue line.

13. The electronic navigational router of claim 2, wherein a failed leg is displayed using a solid red line.

14. The electronic navigational router of claim 1, wherein a leg that is being developed is displayed using a dashed blue line.

15. The electronic navigational router of claim 1, wherein a leg that is awaiting calculation is displayed using a gray line.

* * * * *